(12) United States Patent
Shim

(10) Patent No.: US 7,566,285 B2
(45) Date of Patent: Jul. 28, 2009

(54) POWER TRAIN OF AUTOMATIC TRANSMISSION

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 432 days.

(21) Appl. No.: 11/602,159

(22) Filed: Nov. 20, 2006

(65) Prior Publication Data

US 2008/0039266 A1  Feb. 14, 2008

(30) Foreign Application Priority Data

Aug. 14, 2006  (KR) ...................... 10-2006-0076795

(51) Int. Cl.
*F16H 3/62* (2006.01)
(52) U.S. Cl. ...................... 475/278; 475/281
(58) Field of Classification Search ........... 475/271, 475/277, 278, 279, 281, 283, 285, 287, 288, 475/289, 290, 291, 292, 297, 318, 324
See application file for complete search history.

(56) References Cited

U.S. PATENT DOCUMENTS

| 4,683,776 | A  | * | 8/1987  | Klemen  | 475/286 |
| 6,302,820 | B1 | * | 10/2001 | Ried    | 475/276 |
| 7,285,069 | B2 | * | 10/2007 | Klemen  | 475/275 |
| 7,384,364 | B2 | * | 6/2008  | Jang    | 475/275 |
| 2004/0053726 | A1 | * | 3/2004  | Lee et al. | 475/269 |
| 2007/0275815 | A1 | * | 11/2007 | Raghavan | 475/276 |

* cited by examiner

*Primary Examiner*—Richard M. Lorence
*Assistant Examiner*—Edwin A. Young
(74) *Attorney, Agent, or Firm*—Morgan, Lewis & Bockius LLP

(57) ABSTRACT

A power train of an automatic transmission realizing seven forward speeds and three reverse speeds includes an input shaft, a transmission case, a speed reduction unit including an output unit, a first clutch, a second clutch, a second brake, a third brake, and a fourth brake. The output unit generates seven forward speeds and three reverse speeds at the shift speed output member by operations of the first and second variable input members and third and fourth variably stopped members in response to operation of the clutches and brakes.

86 Claims, 12 Drawing Sheets

FIG. 11

| shift speed | C1 | C2 | B1 | B2 | B3 | B4 | F1 | speed ratio | step ratio |
|---|---|---|---|---|---|---|---|---|---|
| D1 | | | ● | ○ | | | ● | 4.46 | |
| D2 | ● | | ● | | | | | 2.68 | 1.66 |
| D3 | | | ● | | ● | | | 1.80 | 1.49 |
| D4 | | ● | ● | | | | | 1.31 | 1.37 |
| D5 | ● | ● | | | | | | 1.00 | 1.31 |
| D6 | | ● | | | ● | | | 0.83 | 1.21 |
| D7 | | ● | | ● | | | | 0.73 | 1.14 |
| REV. 1 | | | | ● | | ● | | −3.92 | |
| REV. 2 | | | | | ● | ● | | −2.36 | 6.14 |
| REV. 3 | ● | | | | | ● | | −1.58 | |

$Zr1/Zs1=2$, $Zr2/Zs2=2.48$, $Zr3/Zs3=2.68$, $Zr4/Zs4=3.24$

POWER TRAIN OF AUTOMATIC TRANSMISSION

CROSS-REFERENCE TO RELATED APPLICATION

This application claims priority to and the benefit of Korean Patent Application No. 10-2006-0076795 filed in the Korean Intellectual Property Office on Aug. 14, 2006, the entire contents of which are incorporated herein by reference.

BACKGROUND OF THE INVENTION (a) Field of the Invention

The present invention relates to a power train of an automatic transmission. More particularly, the present invention relates to a power train of an automatic transmission that realizes seven forward speeds and three reverse speeds.

(b) Description of the Related Art

A typical shift mechanism of an automatic transmission utilizes a combination of a plurality of planetary gear sets. A power train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a power train such as durability, efficiency in power transmission, and size depend a lot on the layout of combined planetary gear sets. Therefore, designs for a combining structure of a power train are also under constant investigation.

A manual transmission that has too many speeds causes the inconvenience of excessively frequent shifting operations by the driver. Therefore, the positive features of more shift-speeds are more important for automatic transmissions because an automatic transmission automatically controls shifting operations basically without needing any manual operation.

As more speeds in an automatic transmission are realized, a power train that can easily skip up-shift and skip down-shift as well as normally up-shift and down-shift is required.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a power train of an automatic transmission having advantages of realizing seven forward speeds and three reverse speeds and facilitating skip up-shifting and skip sown-shifting.

Exemplary power trains of an automatic transmission according to embodiments of the present invention may include: an input shaft; a transmission case; a speed reduction unit including a fixed input member that is fixedly connected to the input shaft, first and second variably stopped members that are variably connected to the transmission case, and a reduced speed output member that outputs first and second reduced rotational speeds; an output unit including a first variable input member that is fixedly connected to the reduced speed output member and is variably connected to the input shaft, a second variable input member that is variably connected to the input shaft, third and fourth variably stopped members that are variably connected to the transmission case, and a shift speed output member that always acts as an output member by being fixedly connected to the output gear, wherein the output unit generates seven forward speeds and three reverse speeds at the shift speed output member by operations of the first and second variable input members and the third and fourth variably stopped members; a first clutch for variably connecting the first variable input member to the input shaft; a second clutch for variably connecting the second variable input member to the input shaft; a first brake for variably stopping the third variably stopped member; a second brake for variably stopping the first variably stopped member; a third brake for variably stopping the second variably stopped member; and a fourth brake for variably stopping the fourth variably stopped member.

According to a first exemplary embodiment of the present invention, the speed reduction unit may include a Ravigneaux planetary gear set having a long-pinion-side sun gear, a short-pinion-side sun gear, a Ravigneaux planet carrier, and a Ravigneaux ring gear as operational members thereof, wherein the short-pinion-side sun gear is operated as the fixed input member, the Ravigneaux planet carrier is operated as the first variably stopped member, the long-pinion-side sun gear is operated as the second variably stopped member, and the Ravigneaux ring gear is operated as the reduced speed output member.

The output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first ring gear is operated as the first variable input member, at least one of the fixedly connected first planet carrier and second ring gear is operated as the second variable input member, at least one of the fixedly connected first sun gear and second sun gear is operated as the third variably stopped member, the first planet carrier is operated as the fourth variably stopped member, and the second planet carrier is operated as the shift speed output member.

The Ravigneaux planetary gear set and the first and second planetary gear sets may be disposed in a sequence of the Ravigneaux planetary gear set, the first planetary gear set, and the second planetary gear set.

The first and second clutches may be disposed between the speed reduction unit and the output unit.

The second and third brakes may be disposed on an opposite side to the output unit with reference to the speed reduction unit.

The first and fourth brakes may be disposed between the first planetary gear set and the second planetary gear set.

A one-way clutch, disposed in parallel with the second brake, may be disposed between the first variably stopped member and the transmission case.

The input shaft and the output gear may be disposed on the same side.

According to a second exemplary embodiment of the present invention, the speed reduction unit may include: a first planetary gear set having a first sun gear, a first planet carrier, and a first ring gear as operational members thereof; and a second planetary gear set having a second sun gear, a second planet carrier, and a second ring gear as operational members thereof, wherein the second ring gear is operated as the fixed input member, the first planet carrier is operated as the first variably stopped member, the first sun gear is operated as the second variably stopped member, the first ring gear is operated as the reduced speed output member, the second sun gear is fixedly connected to the first sun gear, and the second planet carrier is fixedly connected to the first ring gear.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the third planet carrier is operated as the second variable input member, the fourth sun gear is operated as the third variably stopped member, at least one of the fixedly connected third planet carrier and fourth ring gear is operated as the fourth variably stopped member, and at least one of the fixedly connected third ring gear and fourth planet carrier is operated as the shift speed output member.

The first, second, third, and fourth planetary gear sets may be disposed in a sequence of the first planetary gear set, the second planetary gear set, the third planetary gear set, and the fourth planetary gear set.

The first and second clutches and the fourth brake may be disposed between the speed reduction unit and the output unit.

The second and third brakes may be disposed on an opposite side to the output unit with reference to the speed reduction unit.

The first brake may be disposed on an opposite side to the speed reduction unit with reference to the output unit.

A one-way clutch, disposed in parallel with the second brake, may be disposed between the first variably stopped member and the transmission case.

The input shaft and the output gear may be disposed on the same side.

According to a third exemplary embodiment of the present invention, the speed reduction unit may include: a first planetary gear set having a first sun gear, a first planet carrier, and a first ring gear as operational members thereof; and a second planetary gear set having a second sun gear, a second planet carrier, and a second ring gear as operational members thereof, wherein the second sun gear is operated as the fixed input member, the first planet carrier is operated as the first variably stopped member, the first sun gear is operated as the second variably stopped member, at least one of the fixedly connected first ring gear and second planet carrier is operated as the reduced speed output member, and the second ring gear is fixedly connected to the first planet carrier.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the third planet carrier is operated as the second variable input member, the fourth sun gear is operated as the third variably stopped member, at least one of the fixedly connected third planet carrier and fourth ring gear is operated as the fourth variably stopped member, and at least one of the fixedly connected third ring gear and fourth planet carrier is operated as the shift speed output member.

The first, second, third, and fourth planetary gear sets may be disposed in a sequence of the first planetary gear set, the second planetary gear set, the third planetary gear set, and the fourth planetary gear set.

The first and second clutches and the fourth brake may be disposed between the speed reduction unit and the output unit.

The second and third brakes may be disposed on an opposite side to the output unit with reference to the speed reduction unit.

The first brake may be disposed on an opposite side to the speed reduction unit with reference to the output unit.

A one-way clutch, disposed in parallel with the second brake, may be disposed between the first variably stopped member and the transmission case.

The input shaft and the output gear may be disposed on the same side.

According to a fourth exemplary embodiment of the present invention, the speed reduction unit is the same as the speed reduction unit of the first exemplary embodiment of the present invention.

According to the fourth exemplary embodiment of the present invention, the output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is operated as the first variable input member, the first planet carrier is operated as the second variable input member, the second sun gear is operated as the third variably stopped member, at least one of the fixedly connected first planet carrier and second ring gear is operated as the fourth variably stopped member, and at least one of the fixedly connected first ring gear and second planet carrier is operated as the shift speed output member.

The Ravigneaux planetary gear set and the first and second planetary gear sets may be disposed in a sequence of the Ravigneaux planetary gear set, the first planetary gear set, and the second planetary gear set.

The first and second clutches and the fourth brake may be disposed between the speed reduction unit and the output unit.

The second and third brakes may be disposed on an opposite side to the output unit with reference to the speed reduction unit.

The first brake may be disposed on an opposite side to the speed reduction unit with reference to the output unit.

A one-way clutch, disposed in parallel with the second brake, may be disposed between the first variably stopped member and the transmission case.

The input shaft and the output gear may be disposed on the same side.

According to a fifth exemplary embodiment of the present invention, the speed reduction unit is the same as the speed reduction unit of the second exemplary embodiment of the present invention.

According to the fifth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is operated as the first variable input member, at least one of the fixedly connected third planet carrier and fourth ring gear is operated as the second variable input member, at least one of the fixedly connected third sun gear and fourth sun gear is operated as the third variably stopped member, the third planet carrier is operated as the fourth variably stopped member, and the fourth planet carrier is operated as the shift speed output member.

The first, second, third, and fourth planetary gear sets may be disposed in a sequence of the first planetary gear set, the second planetary gear set, the third planetary gear set, and the fourth planetary gear set.

The first and second clutches may be disposed between the speed reduction unit and the output unit.

The second and third brakes may be disposed on an opposite side to the output unit with reference to the speed reduction unit.

The first and fourth brakes may be disposed between the third planetary gear set and the fourth planetary gear set.

A one-way clutch, disposed in parallel with the second brake, may be disposed between the first variably stopped member and the transmission case.

The input shaft and the output gear may be disposed on the same side.

According to a sixth exemplary embodiment of the present invention, the speed reduction unit is the same as the third exemplary embodiment of the present invention.

According to the sixth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is operated as the first variable input member, at least one of the fixedly connected third planet carrier and fourth ring gear is operated as the second variable input member, at least one of the fixedly connected third sun gear and fourth sun gear is operated as the third variably stopped member, and the third planet carrier is operated as the fourth variably stopped member.

The first, second, third, and fourth planetary gear sets may be disposed in a sequence of the first planetary gear set, the second planetary gear set, the third planetary gear set, and the fourth planetary gear set.

The first and second clutches may be disposed between the speed reduction unit and the output unit.

The second and third brakes may be disposed on an opposite side to the output unit with reference to the speed reduction unit.

The first and fourth brakes may be disposed between the third planetary gear set and the fourth planetary gear set.

A one-way clutch, disposed in parallel with the second brake, may be disposed between the first variably stopped member and the transmission case.

The input shaft and the output gear may be disposed on the same side.

According to a seventh exemplary embodiment of the present invention, the speed reduction unit may include: a first planetary gear set having a first sun gear, a first planet carrier, and a first ring gear as operational members thereof; and a second planetary gear set having a second sun gear, a second planet carrier, and a second ring gear as operational members thereof, wherein the second ring gear is operated as the fixed input member, the first planet carrier is operated as the first variably stopped member, the first sun gear is operated as the second variably stopped member, the first ring gear is operated as the reduced speed output member, the first sun gear is fixedly connected to the second sun gear, and the first planet carrier is fixedly connected to the second planet carrier.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is operated as the first variable input member, at least one of the fixedly connected third planet carrier and fourth ring gear is operated as the second variable input member, at least one of the fixedly connected third sun gear and fourth sun gear is operated as the third variably stopped member, the third planet carrier is operated as the fourth variably stopped member, and the fourth planet carrier is operated as the shift speed output member.

The first, second, third, and fourth planetary gear sets may be disposed in a sequence of the first planetary gear set, the second planetary gear set, the third planetary gear set, and the fourth planetary gear set.

The first and second clutches may be disposed between the speed reduction unit and the output unit.

The second and third brakes may be disposed on an opposite side to the output unit with reference to the speed reduction unit.

The first and fourth brakes may be disposed between the third planetary gear set and the fourth planetary gear set.

A one-way clutch, disposed in parallel with the second brake, may be disposed between the first variably stopped member and the transmission case.

The input shaft and the output gear may be disposed on the same side.

According to a eighth exemplary embodiment of the present invention, the speed reduction unit is the same as the speed reduction unit of the seventh exemplary embodiment of the present invention.

According to the eighth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the third planet carrier is operated as the second variable input member, the fourth sun gear is operated as the third variably stopped member, at least one of the fixedly connected third planet carrier and fourth ring gear is operated as the fourth variably stopped member, and at least one of the fixedly connected third ring gear and fourth planet carrier is operated as the shift speed output member.

The first, second, third, and fourth planetary gear sets may be disposed in a sequence of the first planetary gear set, the second planetary gear set, the third planetary gear set, and the fourth planetary gear set.

The first and second clutches and the fourth brake may be disposed between the speed reduction unit and the output unit.

The second and third brakes may be disposed on an opposite side to the output unit with reference to the speed reduction unit.

The first brake may be disposed on an opposite side to the speed reduction unit with reference to the output unit.

A one-way clutch, disposed in parallel with the second brake, may be disposed between the first variably stopped member and the transmission case.

The input shaft and the output gear may be disposed on the same side.

According to a ninth exemplary embodiment of the present invention, the speed reduction unit may include a compound planetary gear set having a compound sun gear, a compound planet carrier, a long-pinion-side ring gear, and a short-pinion-side ring gear as operational members thereof, wherein the short-pinion-side ring gear is operated as the fixed input member, the compound planet carrier is operated as the first variably stopped member, the compound sun gear is operated as the second variably stopped member, and the long-pinion-side ring gear is operated as the reduced speed output member.

The output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is operated as the first variable input member, the first planet carrier is operated as the second variable input member, the second sun gear is operated as the third variably stopped member, at least one of the fixedly connected first planet carrier and second ring gear is operated as the fourth variably stopped member, and at least one of the fixedly connected first ring gear and second planet carrier is operated as the shift speed output member.

The compound planetary gear set and the first and second planetary gear sets may be disposed in a sequence of the compound planetary gear set, the first planetary gear set, and the second planetary gear set.

The first and second clutches and the fourth brake may be disposed between the speed reduction unit and the output unit.

The second and third brakes may be disposed on an opposite side to the output unit with reference to the speed reduction unit.

The first brake may be disposed on an opposite side to the speed reduction unit with reference to the output unit.

A one-way clutch, disposed in parallel with the second brake, may be disposed between the first variably stopped member and the transmission case.

The input shaft and the output gear may be disposed on the same side.

According to a tenth exemplary embodiment of the present invention, the speed reduction unit is the same as the speed reduction unit of the ninth exemplary embodiment of the present invention.

According to the tenth exemplary embodiment of the present invention, the output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first ring gear is operated as the first variable input member, at least one of the fixedly connected first planet carrier and second ring gear is operated as the second variable input member, at least one of the fixedly connected first sun gear and second sun gear is operated as the third variably stopped member, the first planet carrier is operated as the fourth variably stopped member, and the second planet carrier is operated as the shift speed output member.

The compound planetary gear set and the first and second planetary gear sets may be disposed in a sequence of the compound planetary gear set, the first planetary gear set, and the second planetary gear set.

The first and second clutches may be disposed between the speed reduction unit and the output unit.

The second and third brakes may be disposed on an opposite side to the output unit with reference to the speed reduction unit.

The first and fourth brakes may be disposed between the first planetary gear set and the second planetary gear set.

A one-way clutch, disposed in parallel with the second brake, may be disposed between the first variably stopped member and the transmission case.

The input shaft and the output gear may be disposed on the same side.

According to the exemplary embodiments of the present invention, the first and second brakes and the one-way clutch are operated in a first forward speed, the first and third brakes are operated in a second forward speed, the first clutch and the first brake are operated in a third forward speed, the second clutch and the first brake are operated in a fourth forward speed, the first and second clutches are operated in a fifth forward speed, the second clutch and the third brake are operated in a sixth forward speed, the second clutch and the second brake are operated in a seventh forward speed, the second and fourth brakes are operated in a first reverse speed, the third and fourth brakes are operated in a second reverse speed, and the first clutch and the fourth brake are operated in a third reverse speed.

BRIEF DESCRIPTION OF THE DRAWINGS

FIG. 11 is an operational chart for a power train of an automatic transmission that realizes seven forward speeds and three reverse speeds according to exemplary embodiments of the present invention.

DETAILED DESCRIPTION OF THE EMBODIMENTS

Figure 1:
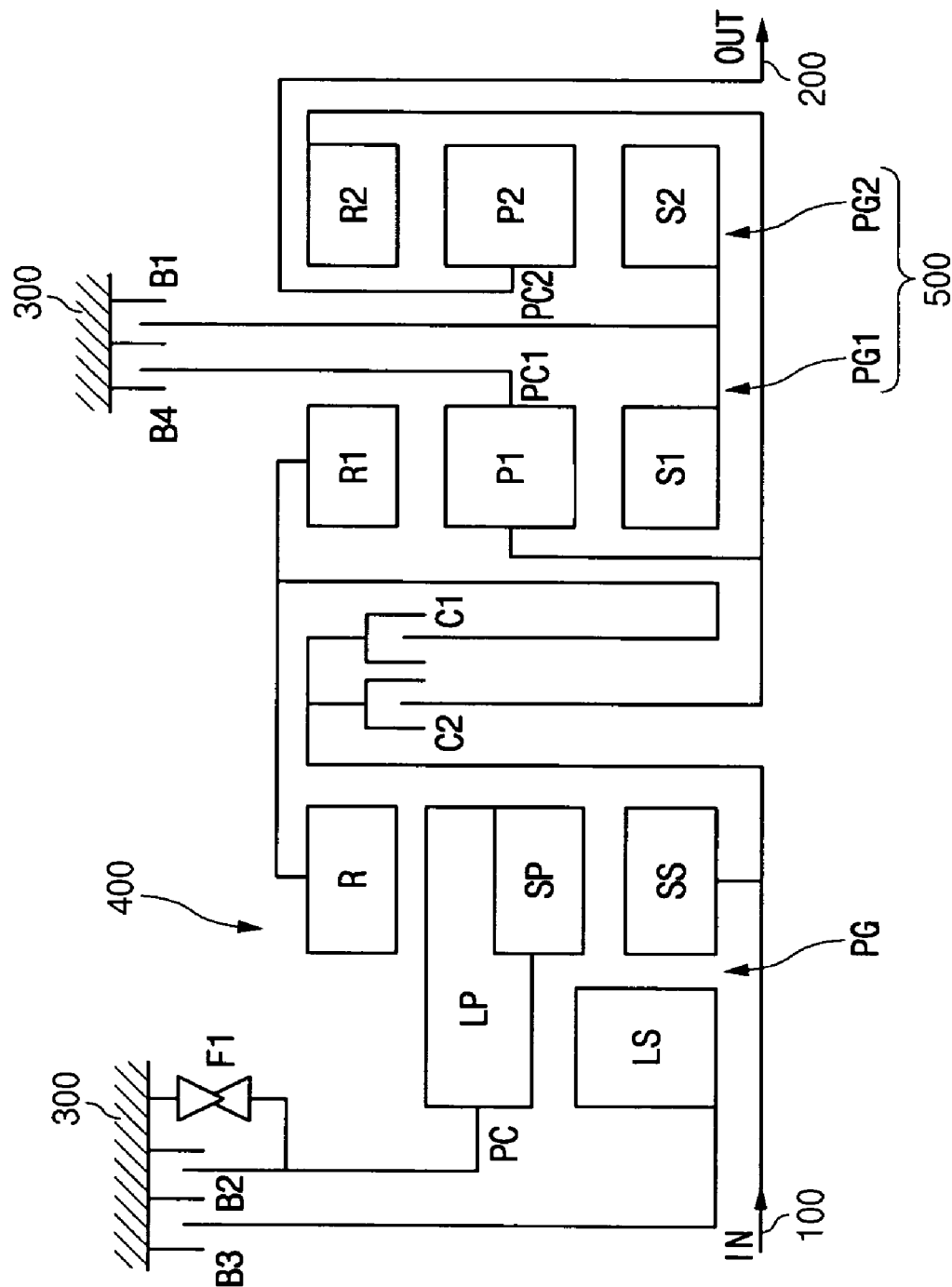
FIG. 1 is a schematic diagram of a power train of an automatic transmission according to a first exemplary embodiment of the present invention.

Exemplary embodiments of the present invention will hereinafter be described in detail with reference to the accompanying drawings.

As shown in FIG. 1 to FIG. 10, exemplary power trains of an automatic transmission according to the embodiments of the present invention include an input shaft 100, an output gear 200, a transmission case 300, a speed reduction unit 400, and an output unit 500. The input shaft 100 receives torque from an engine (not shown). The output gear 200 outputs torque from the power train.

The speed reduction unit 400 includes a fixed input member, first and second variably stopped members, and a reduced speed output member. The speed reduction unit 400 generates first and second reduced rotational speeds that are smaller than a rotational speed of the input shaft 100 at the reduced speed output member by operations of the fixed input member and the first and second variably stopped members.

The output unit 500 includes first and second variable input members, third and fourth variably stopped members, and a shift speed output member. The output unit 500 generates seven forward speeds and three reverse speeds at the shift speed output member by operations of the first and second variable input members and the third and fourth variably stopped members.

In addition, exemplary power trains of an automatic transmission according to embodiments of the present invention include first and second clutches C1 and C2 and first, second, third, and fourth brakes B1, B2, B3, and B4.

The fixed input member acts as an input member by being fixedly connected to the input shaft 100.

The first variably stopped member is variably connected to the transmission case 300 via the second brake B2 and is subjected to a stopping operation of the second brake B2.

The second variably stopped member is variably connected to the transmission case 300 via the third brake B3 and is subjected to a stopping operation of the third brake B3.

Therefore, the first and second reduced rotational speeds are generated at the reduced speed output member by operations of the second and third brakes B2 and B3.

In addition, the reduced speed output member is fixedly connected to the first variable input member. Therefore, the first and second reduced rotational speeds generated at the reduced speed output member are transmitted to the first variable input member.

In addition, the first variable input member is variably connected to the input shaft 100 via the first clutch C1. Therefore, the first variable input member receives the rotational speed of the input shaft 100 by an operation of the first clutch C1.

The second variable input member is variably connected to the input shaft 100 via the second clutch C2. Therefore, the second variable input member receives the rotational speed of the input shaft 100 by an operation of the second clutch C2.

The third variably stopped member is variably connected to the transmission case 300 via the first brake B1 and is subjected to a stopping operation of the first brake B1.

The fourth variably stopped member is variably connected to the transmission case 300 via the fourth brake B4 and is subjected to a stopping operation of the fourth brake B4.

The shift speed output member always acts as an output member by being fixedly connected to the output gear 200.

In addition, according to exemplary embodiments of the present invention, the input shaft 100 and the output gear 200 are disposed on the same side.

In addition, a one-way clutch F1, being disposed in parallel with the second brake B2, is disposed between the first variably stopped member and the transmission case 300.

Hereinafter, referring to FIG. 1, an exemplary power train of an automatic transmission according to a first embodiment of the present invention will be described in detail.

As shown in FIG. 1, according to the first exemplary embodiment of the present invention, the speed reduction unit 400 includes a Ravigneaux planetary gear set PG, and the output unit 500 includes first and second planetary gear sets PG1 and PG2.

The Ravigneaux planetary gear set PG includes a long-pinion-side sun gear LS, a short-pinion-side sun gear SS, a Ravigneaux planet carrier PC, and a Ravigneaux ring gear R as operational members thereof. A long pinion gear LP, being engaged with both the long-pinion-side sun gear LS and the Ravigneaux ring gear R, and a short pinion gear SP, being engaged with the short-pinion-side sun gear SS and the Ravigneaux ring gear R, are connected to, and are carried by, the Ravigneaux planet carrier PC.

The first planetary gear set PG1 is a pinion planetary gear set, and includes a first sun gear S1, a first planet carrier PC1, and a first ring gear R1 as operational members thereof A first pinion gear P1, being engaged with the first ring gear R1 and the first sun gear S1, is connected to, and is carried by, the first planet carrier PC1.

The second planetary gear set PG2 is a single pinion planetary gear set, and includes a second sun gear S2, a second planet carrier PC2, and a second ring gear R2 as operational members thereof. A second pinion gear P2, being engaged with the second ring gear R2 and the second sun gear S2, is connected to, and is carried by, the second planet carrier PC2.

In addition, the Ravigneaux-planetary gear set PG and the first and second planetary gear sets PG1 and PG2 are disposed in a sequence of the Ravigneaux planetary gear set PG, the first planetary gear set PG1, and the second planetary gear set PG2.

According to the first exemplary embodiment of the present invention, the short-pinion-side sun gear SS is operated as the fixed input member, the Ravigneaux planet carrier PC is operated as the first variably stopped member, the long-pinion-side sun gear LS is operated as the second variably stopped member, and the Ravigneaux ring gear R is operated as the reduced speed output member.

In addition, according to the first exemplary embodiment of the present invention, the first ring gear R1 is operated as the first variable input member, at least one of the fixedly connected first planet carrier PC1 and second ring gear R2 is operated as the second variable input member, at least one of the fixedly connected first sun gear S1 and second sun gear S2 is operated as the third variably stopped member, the first planet carrier PC1 is operated as the fourth variably stopped member, and the second planet carrier PC2 is operated as the shift speed output member.

Hereinafter, operations of a power train according to the first exemplary embodiment of the present invention will be described in detail by reference to the operational chart of FIG. 11.

As shown in FIG. 11, according to the first exemplary embodiment of the present invention, the first and second brakes B1 and B2 and the one-way clutch F1 are operated in a first forward speed D1, the first and third brakes B1 and B3 are operated in a second forward speed D2, the first clutch C1 and the first brake B1 are operated in a third forward speed D3, the second clutch C2 and the first brake B1 are operated in a fourth forward speed D4, the first and second clutches C1 and C2 are operated in a fifth forward speed D5, the second clutch C2 and the third brake B3 are operated in a sixth forward speed D6, and the second clutch C2 and the second brake B2 are operated in a seventh forward speed D7.

In addition, the second and fourth brakes B2 and B4 are operated in a first reverse speed REV. 1, the third and fourth brakes B3 and B4 are operated in a second reverse speed REV. 2, and the first clutch C1 and the fourth brake B4 are operated in a third reverse speed REV. 3.

Hereinafter, up-shifting processes of the exemplary power train of an automatic transmission according to the first embodiment of the present invention will be described in detail.

In the shifting process from the first forward speed D1 to the second forward speed D2, the second brake B2 is released and the third brake B3 is operated.

In the shifting process from the second forward speed D2 to the third forward speed D3, the third brake B3 is released and the first clutch C1 is operated.

In the shifting process from the third forward speed D3 to the fourth forward speed D4, the first clutch C1 is released and the second clutch C2 is operated.

In the shifting process from the fourth forward speed D4 to the fifth forward speed D5, the first brake B1 is released and the first clutch C1 is operated.

In the shifting process from the fifth forward speed D5 to the sixth forward speed D6, the first clutch C1 is released and the third brake B3 is operated.

In the shifting process from the sixth forward speed D6 to the seventh forward speed D7, the third brake B3 is released and the second brake B2 is operated.

Down-shifting processes are reverse processes of the up-shifting processes according to the first exemplary embodiment of the present invention.

Hereinafter, skip down-shifting processes according to the first exemplary embodiment of the present invention will be described in detail.

In a skip down-shifting process from the third forward speed D3 to the first forward speed D1, the first clutch C1 is released and the second brake B2 is operated.

In a skip down-shifting process from the fourth forward speed D4 to the second forward speed D2, the second clutch C2 is released and the third brake B3 is operated.

In a skip down-shifting process from the fourth forward speed D4 to the first forward speed D1, the second clutch C2 is released and the second brake B2 is operated.

In a skip down-shifting process from the fifth forward speed D5 to the third forward speed D3, the second clutch C2 is released and the first brake B1 is operated.

In a skip down-shifting process from the fifth forward speed D5 to the second forward speed D2, 5→3 shifting and 3→2 shifting may be performed in sequence or 5→4 shifting and 4→2 shifting may be performed in sequence.

In a skip down-shifting process from the sixth forward speed D6 to the fourth forward speed D4, the third brake B3 is released and the first brake B1 is operated.

In a skip down-shifting process from the sixth forward speed D6 to the third forward speed D3, 6→5 shifting and 5→3 shifting may be performed in sequence or 6→4 shifting and 4→3 shifting may be performed in sequence.

In a skip down-shifting process from the seventh forward speed D7 to the fifth forward speed D5, the second brake B2 is released and the first clutch C1 is operated.

In a skip down-shifting process from the seventh forward speed D7 to the fourth forward speed D4, the second brake B2 is released and the first brake B1 is operated.

Skip up-shifting processes are reverse processes of the skip down-shifting processes according to the first exemplary embodiment of the present invention.

Figure 12:
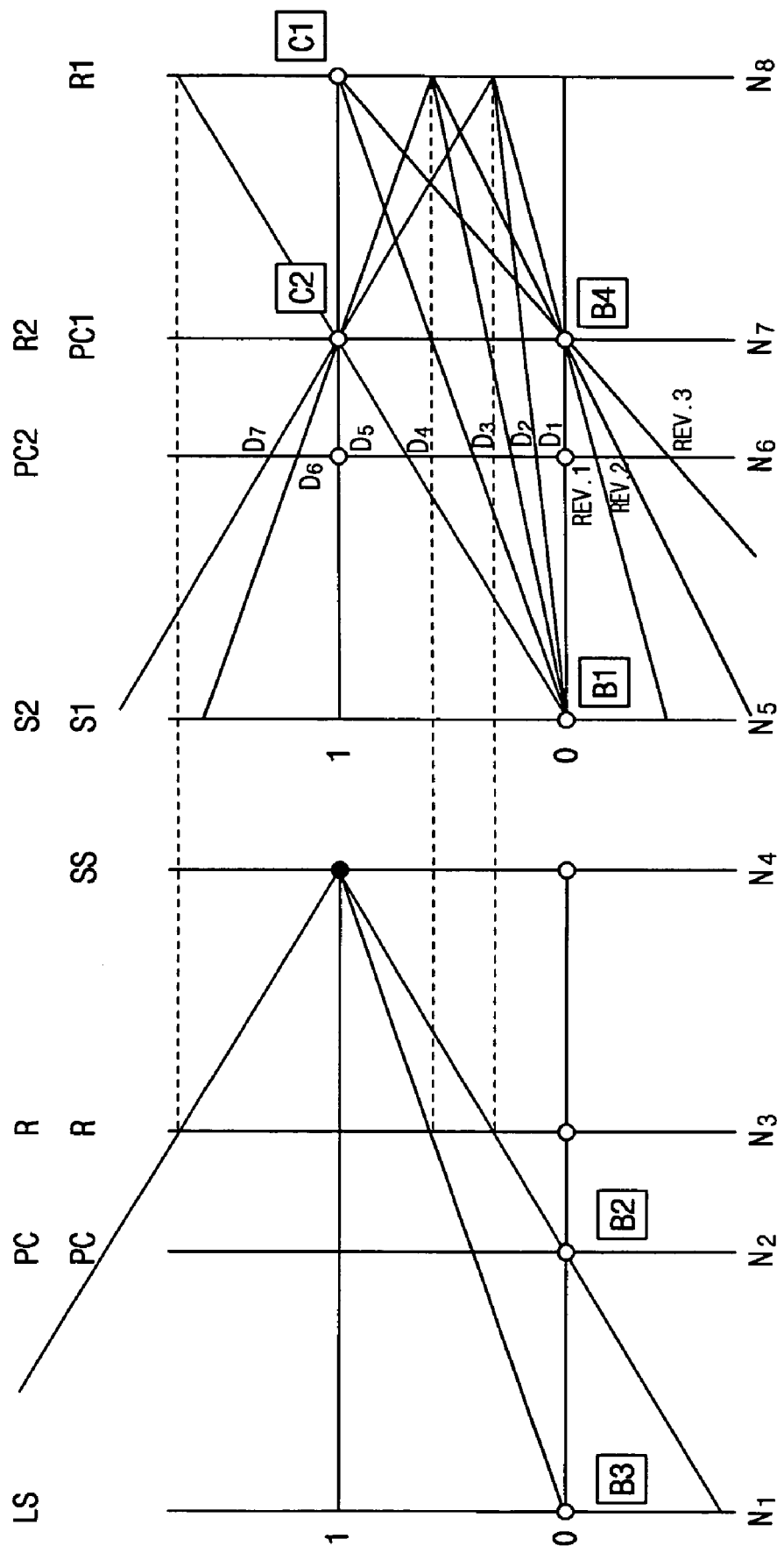
FIG. 12 is a lever diagram showing shifting processes from a first forward speed to a seventh forward speed, and from a first reverse speed to a third reverse speed in a power train of an automatic transmission according to a first embodiment of the present invention.

As shown in the diagram of FIG. 12, the power train of an automatic transmission according to the first exemplary embodiment of the present invention includes the Ravigneaux planetary gear set and two single pinion planetary gear sets. In addition, the first planet carrier PC1 is fixedly connected to the second ring gear R2, and the first sun gear S1 is fixedly connected to the second sun gear S2. Therefore, operational members of the exemplary power train according to the first embodiment of the present invention are represented as eight nodes in the lever diagram.

Accordingly, the long-pinion-side sun gear LS is set to a first node N1, the Ravigneaux planet carrier PC is set to a second node N2, the Ravigneaux ring gear R is set to a third node N3, the short-pinion-side sun gear SS is set to a fourth node N4, the first sun gear S1 and the second sun gear S2 are set to a fifth node N5, the second planet carrier PC2 is set to a sixth node N6, the second ring gear R2 and the first planet carrier PC1 are set to the seventh node N7, the first ring gear R1 is set to the eighth node N8.

As described above, the short-pinion-side sun gear SS is fixedly connected to the input shaft 100. Therefore, the fourth node N4 of the short-pinion-side sun gear SS rotates with the same rotational speed as the input shaft 100.

In addition, the Ravigneaux planet carrier PC is variably connected to the transmission case 300 via the second brake B2. Therefore, the second node N2 is stopped by an operation of the second brake B2.

In addition, the long-pinion-side sun gear LS is variably connected to the transmission case 300 via the third brake B3. Therefore, the first node N1 is stopped by an operation of the third brake B3.

In addition, the Ravigneaux ring gear R is fixedly connected to the first ring gear R1.

Thus, the rotational speed of the engine input through the fourth node N4 is reduced to the first and second reduced rotational speeds at the third node N3 of the Ravigneaux ring gear R by an operation of the speed reduction unit 400, and the first and second reduced rotational speeds are transmitted to the eighth node N8 of the first ring gear R1.

In addition, the first ring gear R1 is variably connected to the input shaft 100 via the first clutch C1. Therefore, the rotational speed of the input shaft 100 is transmitted to the eighth node N8 by an operation of the first clutch C1.

In addition, at least one of the fixedly connected first planet carrier PC1 and second ring gear R2 is variably connected to the input shaft 100 via the second clutch C2. Therefore, the rotational speed of the input shaft 100 is transmitted to the seventh node N7 by an operation of the second clutch C2.

In addition, at least one of the fixedly connected first sun gear S1 and second sun gear S2 is variably connected to the transmission case 300 via the first brake B1. Therefore, the fifth node N5 is stopped by an operation of the first brake B1.

In addition, the first planet carrier PC1 is variably connected to the transmission case 300 via the fourth brake B4. Therefore, the seventh node N7 is stopped by an operation of the fourth brake B4.

In addition, the second planet carrier PC2 is fixedly connected to the output gear 200. Therefore, the sixth node N6 delivers each shift speed that is generated by operations of the speed reduction unit 400 and the output unit 500 to the output gear 200.

Hereinafter, formation of each speed by the power train of an automatic transmission according to the first exemplary embodiment of the present invention will be described in detail, with reference to FIG. 12.

In the first forward speed D1, the second node N2 is stopped by an operation of the second brake B2, and the fourth node N4 fixedly connected to the input shaft 100 rotates with the same rotational speed as the input shaft 100. Therefore, the first reduced rotational speed is generated at the third node N3, and the eighth node N8 fixedly connected to the third node N3 rotates with the first reduced rotational speed.

In addition, the fifth node N5 is stopped by an operation of the first brake B1. Therefore, the first forward speed D1 is achieved at the sixth node N6 that is the shift speed output member.

In the second forward speed D2, the first node N1 is stopped by an operation of the third brake B3, and the fourth node N4 fixedly connected to the input shaft 100 rotates with the same rotational speed as the input shaft 100. Therefore, the second reduced rotational speed is generated at the third node N3, and the eighth node N8 fixedly connected to the third node N3 rotates with the second reduced rotational speed.

In addition, the fifth node N5 is stopped by an operation of the first brake B1. Therefore, the second forward speed D2 is achieved at the sixth node N6 that is the shift speed output member.

In the third forward speed D3, the eighth node N8 rotates with the same rotational speed as the input shaft 100 by an operation of the first clutch C1. In addition, the fifth node N5 is stopped by an operation of the first brake B1. Therefore, the third forward speed D3 is achieved at the sixth node N6 that is the shift speed output member.

In the fourth forward speed D4, the seventh node N7 rotates with the same rotational speed as the input shaft 100 by an operation of the second clutch C2. In addition, the fifth node N5 is stopped by an operation of the first brake B1. Therefore, the fourth forward speed D4 is achieved at the sixth node N6 that is the shift speed output-member.

In the fifth forward speed D5, the seventh and eighth nodes N7 and N8 rotate with the same rotational speed as the input shaft 100 by operations of the first and second clutches C1 and C2, respectively. Therefore, the fifth forward speed D5 is achieved at the sixth node N6 that is the shift speed output member.

In the sixth forward speed D6, the first node N1 is stopped by an operation of the third brake B3, and the fourth node N4 fixedly connected to the input shaft 100 rotates with the same rotational speed as the input shaft 100. Therefore, the second reduced rotational speed is generated at the third node N3, and the eighth node N8 fixedly connected to the third node N3 rotates with the second reduced rotational speed.

In addition, the seventh node N7 rotates with the same rotational speed as the input shaft 100 by an operation of the second clutch C2. Therefore, the sixth forward speed D6 is achieved at the sixth node N6 that is the shift speed output member.

In the seventh forward speed D7, the second node N2 is stopped by an operation of the second brake B2, and the fourth node N4 fixedly connected to the input shaft 100 rotates with the same rotational speed as the input shaft 100. Therefore, the first reduced rotational speed is generated at the third node N3, and the eighth node N8 fixedly connected to the third node N3 rotates with the first reduced rotational speed.

In addition, the seventh node N7 rotates with the same rotational speed as the input shaft 100 by an operation of the second clutch C2. Therefore, the seventh forward speed D7 is achieved at the sixth node N6 that is the shift speed output member.

In the first reverse speed REV. 1, the second node N2 is stopped by an operation of the second brake B2, and the fourth node N4 fixedly connected to the input shaft 100 rotates with the same rotational speed as the input shaft 100. Therefore, the first reduced rotational speed is generated at the third node N3, and the eighth node N8 fixedly connected to the third node N3 rotates with the first reduced rotational speed.

In addition, the seventh node N7 is stopped by an operation of the fourth brake B4. Therefore, the first reverse speed REV. 1 is achieved at the sixth node N6 that is the shift speed output member.

In the second reverse speed REV. 2, the first node N1 is stopped by an operation of the third brake B3, and the fourth node N4 fixedly connected to the input shaft 100 rotates with the same rotational speed as the input shaft 100. Therefore, the second reduced rotational speed is generated at the third node N3, and the eighth node N8 fixedly connected to the third node N3 rotates with the second reduced rotational speed.

In addition, the seventh node N7 is stopped by an operation of the fourth brake B4. Therefore, the second reverse speed REV. 2 is achieved at the sixth node N6 that is the shift speed output member.

In the third reverse speed REV. 3, the eighth node N8 rotates with the same rotational speed as the input shaft 100 by an operation of the first clutch C 1.

In addition, the seventh node N7 is stopped by an operation of the fourth brake B4. Therefore, the third reverse speed REV. 3 is achieved at the sixth node N6 that is the shift speed output member.

As described above, the speed line for each planetary gear set may be easily obtained by a person of an ordinary skill in the art based on the teachings herein.

Hereinafter, referring to FIG. 2, the exemplary power train of an automatic transmission according to a second embodiment of the present invention will be described in detail.

Figure 2:
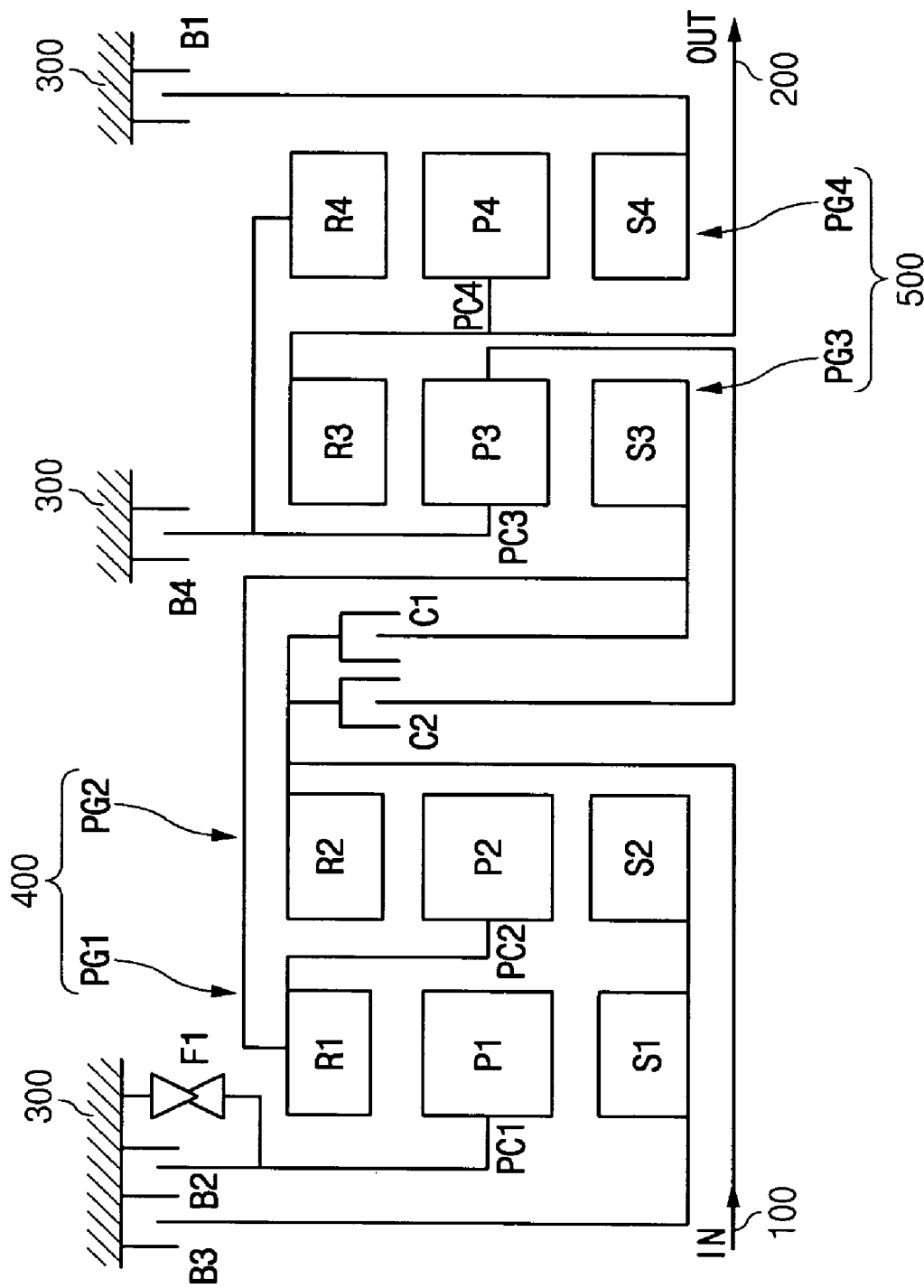
FIG. 2 is a schematic diagram of a power train of an automatic transmission according to the second exemplary embodiment of the present invention.

As shown in FIG. 2, according to the second exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the second exemplary embodiment of the present invention, the second ring gear R2 is operated as the fixed input member, the first planet carrier PC1 is operated as the first variably stopped member, the first sun gear S1 is operated as the second variably stopped member, and the first ring gear R1 is operated as the reduced speed output member.

The second sun gear S2 is fixedly connected to the first sun gear S1, and the second planet carrier PC2 is fixedly connected to the first ring gear R1.

In addition, the third sun gear S3 is operated as the first variable input member, the third planet carrier PC3 is operated as the second variable input member, the fourth sun gear S4 is operated as the third variably stopped member, at least one of the fixedly connected third planet carrier PC3 and fourth ring gear R4 is operated as the fourth variably stopped member, and at least one of the fixedly connected third ring gear R3 and fourth planet carrier PC4 is operated as the shift speed output member.

According to the second exemplary embodiment of the present invention, the first and second clutches C1 and C2 and the fourth brake B4 are disposed between the speed reduction unit 400 and the output unit 500.

In addition, the second and third brakes B2 and B3 are disposed on an opposite side to the output unit 500 with reference to the speed reduction unit 400.

In addition, the first brake B1 is disposed on an opposite side to the speed reduction unit 400 with reference to the output unit 500.

Hereinafter, referring to FIG. 3, the power train of an automatic transmission according to a third exemplary embodiment of the present invention will be described in detail.

Figure 3:
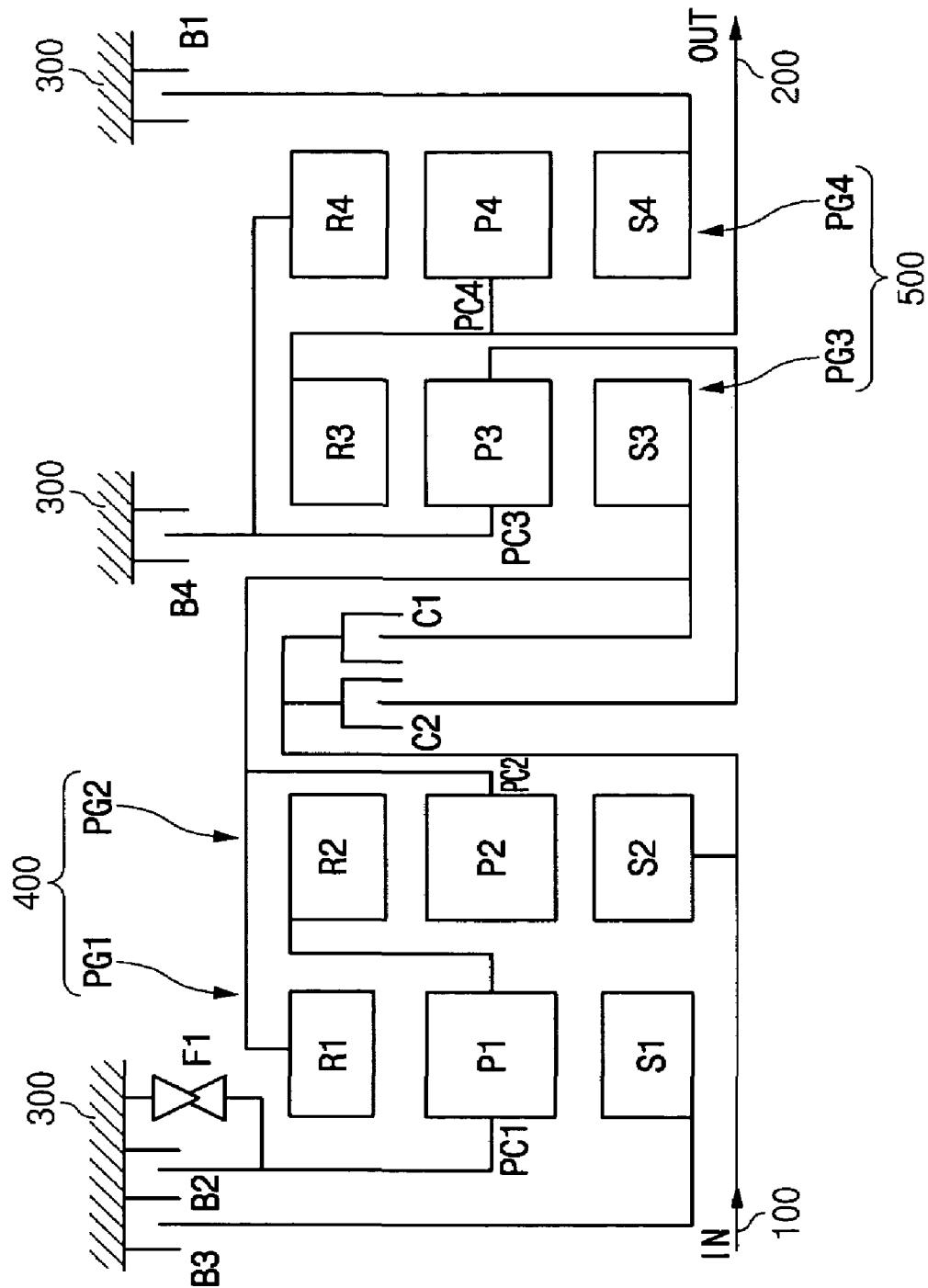
FIG. 3 is a schematic diagram of a power train of an automatic transmission according to a third exemplary embodiment of the present invention.

As shown in FIG. 3, according to the third exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the third exemplary embodiment of the present invention, the second sun gear S2 is operated as the fixed input member, the first planet carrier PC1 is operated as the first variably stopped member, the first sun gear S1 is operated as the second variably stopped member, and at least one of the fixedly connected first ring gear R1 and second planet carrier PC2 is operated as the reduced speed output member.

The second ring gear R2 is fixedly connected to the first planet carrier PC1.

In addition, the third sun gear S3 is operated as the first variable input member, the third planet carrier PC3 is operated as the second variable input member, the fourth sun gear S4 is operated as the third variably stopped member, at least one of the fixedly connected third planet carrier PC3 and fourth ring gear R4 is operated as the fourth variably stopped member, and at least one of the fixedly connected third ring gear R3 and fourth planet carrier PC4 is operated as the shift speed output member.

According to the third exemplary embodiment of the present invention, the first and second clutches C1 and C2 and the fourth brake B4 are disposed between the speed reduction unit 400 and the output unit 500.

The second and third brakes B2 and B3 are disposed on an opposite side to the output unit 500 with reference to the speed reduction unit 400.

The first brake B1 is disposed on an opposite side to the speed reduction unit 400 with reference to the output unit 500.

Hereinafter, referring to FIG. 4, the exemplary power train of an automatic transmission according to a fourth embodiment of the present invention will be described in detail.

Figure 4:
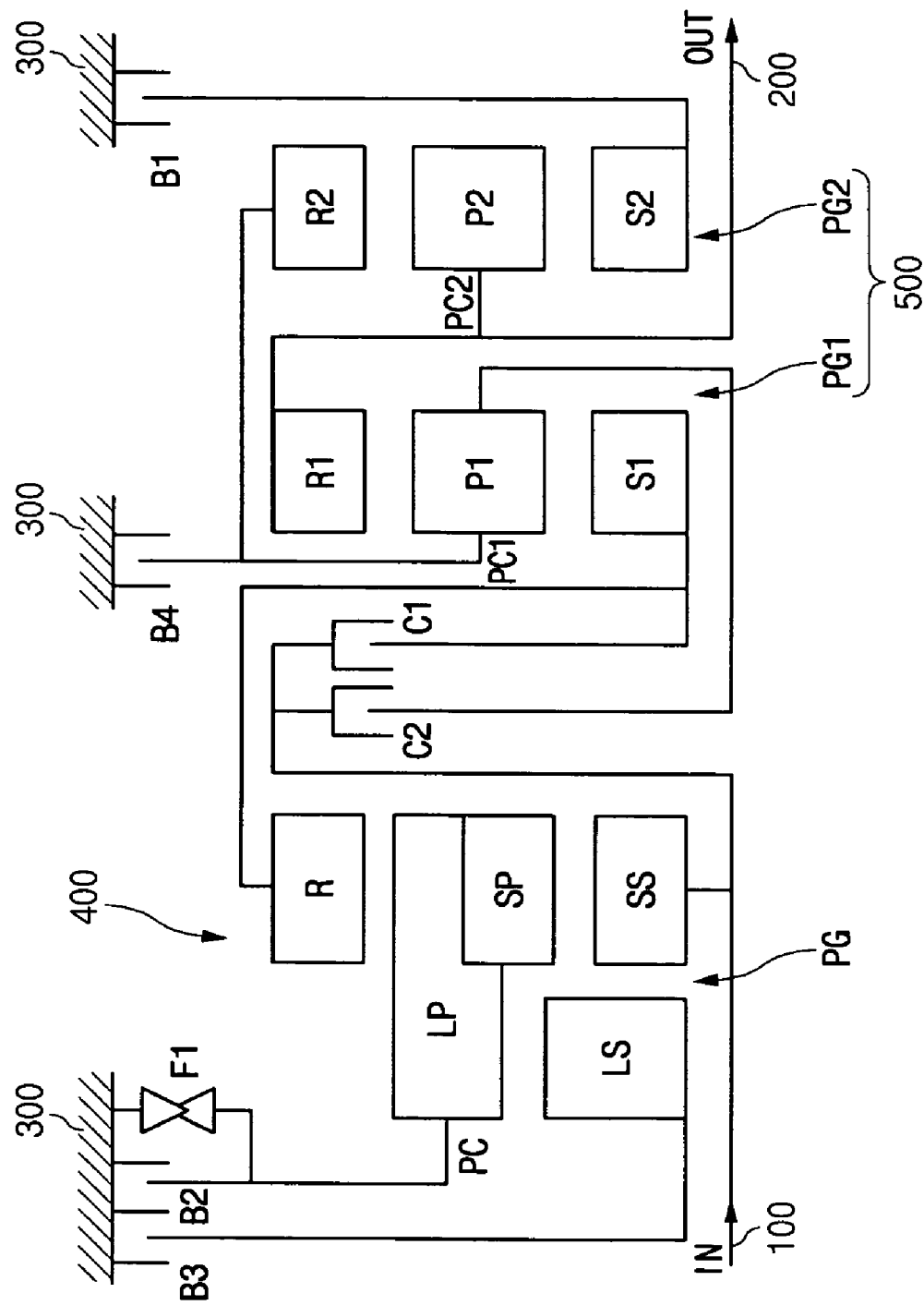
FIG. 4 is a schematic diagram of a power train of an automatic transmission according to a fourth exemplary embodiment of the present invention.

As shown in FIG. 4, according to the fourth exemplary embodiment of the present invention, the speed reduction unit 400 includes a Ravigneaux planetary gear set PG, and the output unit 500 includes first and second planetary gear sets PG1 and PG2.

The Ravigneaux planetary gear set PG includes a Ravigneaux ring gear R, a Ravigneaux planet carrier PC, a long-pinion-side sun gear LS, and a short-pinion-side sun gear SS as operational members thereof.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

In addition, the Ravigneaux planetary gear set PG and the first and second planetary gear sets PG1 and PG2 are disposed in a sequence of the Ravigneaux planetary gear set PG, the first planetary gear set PG1, and the second planetary gear set PG2.

According to the fourth exemplary embodiment of the present invention, the short-pinion-side sun gear SS is operated as the fixed input member, the Ravigneaux planet carrier PC is operated as the first variably stopped member, the long-pinion-side sun gear LS is operated as the second variably stopped member, and the Ravigneaux ring gear R is operated as the reduced speed output member.

In addition, the first sun gear S1 is operated as the first variable input member, the first planet carrier PC1 is operated as the second variable input member, the second sun gear S2 is operated as the third variably stopped member, at least one of the fixedly connected first planet carrier PC1 and second ring gear R2 is operated as the fourth variably stopped member, and at least one of the fixedly connected first ring gear R1 and second planet carrier PC2 is operated as the shift speed output member.

According to the fourth exemplary embodiment of the present invention, the first and second clutches C1 and C2 and the fourth brake B4 are disposed between the speed reduction unit 400 and the output unit 500.

The second and third brakes B2 and B3 are disposed on an opposite side to the output unit 500 with reference to the speed reduction unit 400.

The first brake B1 is disposed on an opposite side to the speed reduction unit 400 with reference to the output unit 500.

Hereinafter, referring to FIG. 5, the power train of an automatic transmission according to a fifth exemplary embodiment of the present invention will be described in detail.

Figure 5:
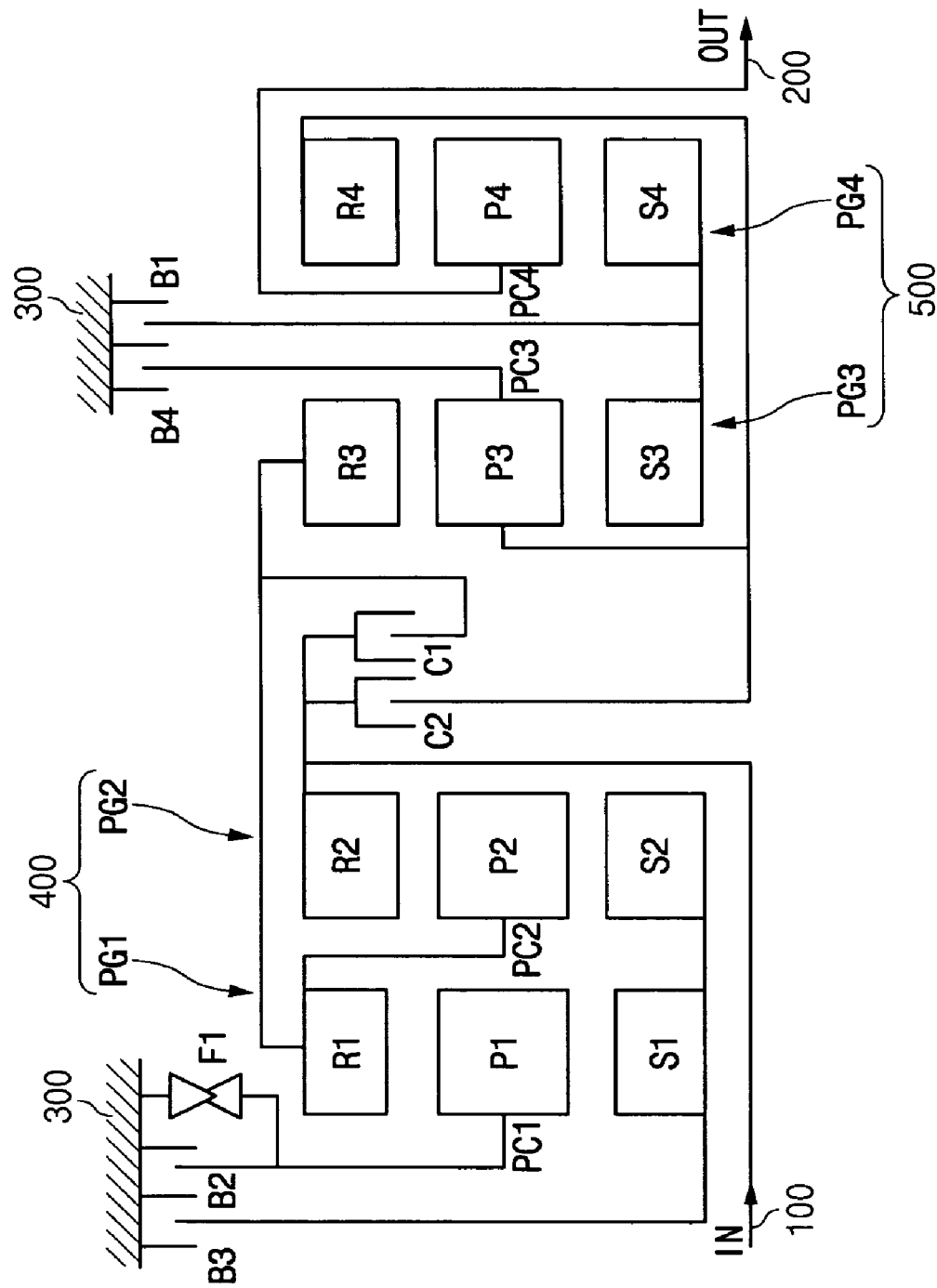
FIG. 5 is a schematic diagram of a power train of an automatic transmission according to a fifth exemplary embodiment of the present invention.

As shown in FIG. 5, according to the fifth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the fifth exemplary embodiment of the present invention, the second ring gear R2 is operated as the fixed input member, the first planet carrier PC1 is operated as the first variably stopped member, the first sun gear S1 is operated as the second variably stopped member, and the first ring gear R1 is operated as the reduced speed output member.

The second sun gear S2 is fixedly connected to the first sun gear S1, and the second planet carrier PC2 is fixedly connected to the first ring gear R1.

In addition, the third ring gear R3 is operated as the first variable input member, at least one of the fixedly connected third planet carrier PC3 and fourth ring gear R4 is operated as the second variable input member, at least one of the fixedly connected third sun gear S3 and fourth sun gear S4 is operated as the third variably stopped member, the third planet carrier PC3 is operated as the fourth variably stopped member, and the fourth planet carrier PC4 is operated as the shift speed output member.

The first and second clutches C1 and C2 are disposed between the speed reduction unit 400 and the output unit 500.

The second and third brakes B2 and B3 are disposed on an opposite side to the output unit 500 with reference to the speed reduction unit 400.

The first and fourth brakes B1 and B4 are disposed between the third planetary gear set PG3 and the fourth planetary gear set PG4.

Hereinafter, referring to FIG. 6, the exemplary power train of an automatic transmission according to a sixth embodiment of the present invention will be described in detail.

Figure 6:
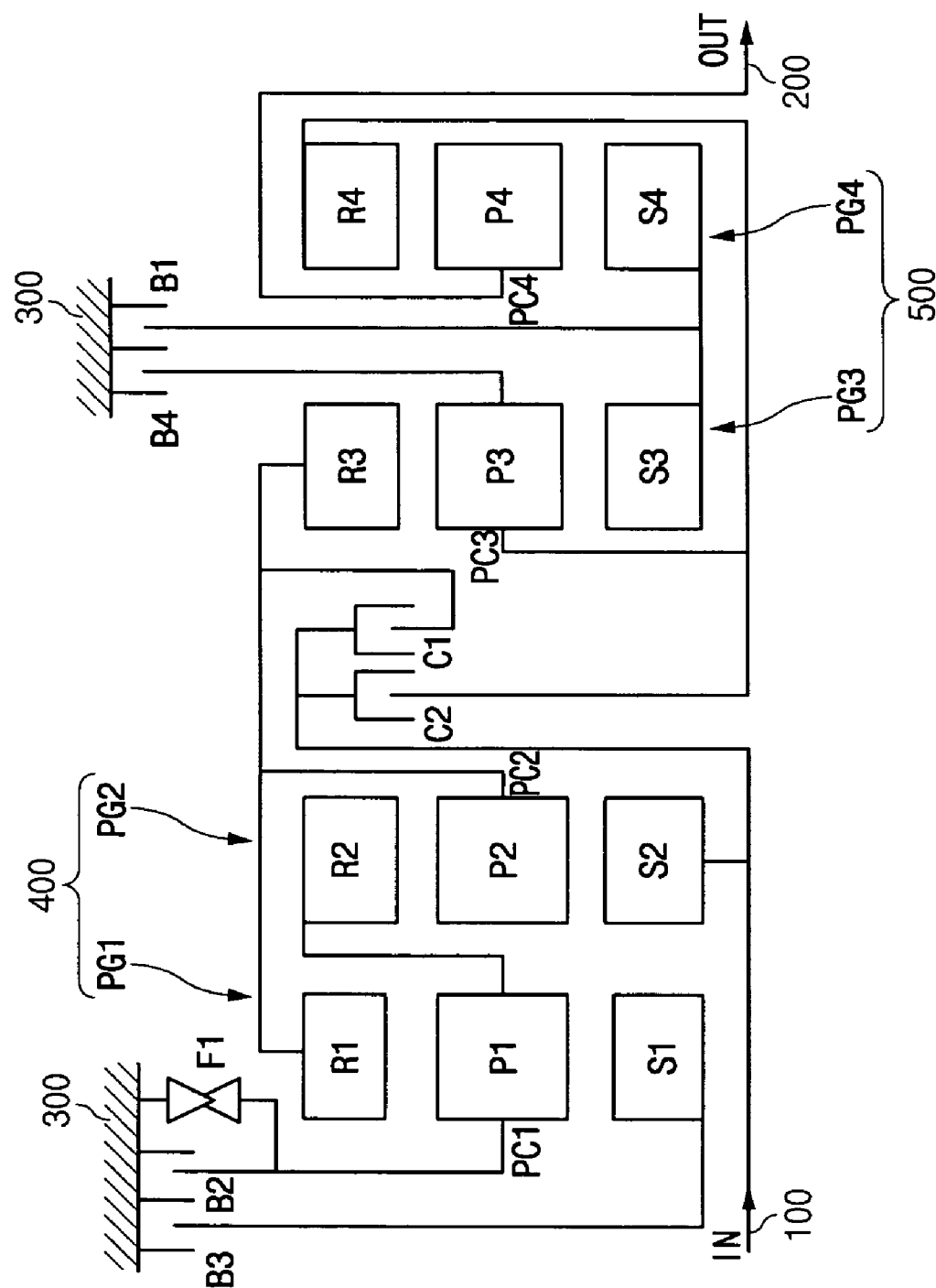
FIG. 6 is a schematic diagram of a power train of an automatic transmission according to a sixth exemplary embodiment of the present invention.

As shown in FIG. 6, according to the sixth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the sixth exemplary embodiment of the present invention, the second sun gear S2 is operated as the fixed input member, the first planet carrier PC1 is operated as the first variably stopped member, the first sun gear S1 is operated as the second variably stopped member, and at least one of the fixedly connected first ring gear R1 and the second planet carrier PC2 is operated as the reduced speed output member.

The second ring gear R2 is fixedly connected to the first planet carrier PC1.

In addition, the third ring gear R3 is operated as the first variable input member, at least one of the fixedly connected third planet carrier PC3 and fourth ring gear R4 is operated as the second variable input member, at least one of the fixedly connected third sun gear S3 and fourth sun gear S4 is operated as the third variably stopped member, and the third planet carrier. PC3 is operated as the fourth variably stopped member.

The first and second clutches C1 and C2 are disposed between the speed reduction unit 400 and the output unit 500.

The second and third brakes B2 and B3 are disposed on an opposite side to the output unit 500 with reference to the speed reduction unit 400.

The first and fourth brakes B1 and B4 are disposed between the third planetary gear set PG3 and the fourth planetary gear set PG4.

Hereinafter, referring to FIG. 7, the exemplary power train of an automatic transmission according to a seventh embodiment of the present invention will be described in detail.

Figure 7:
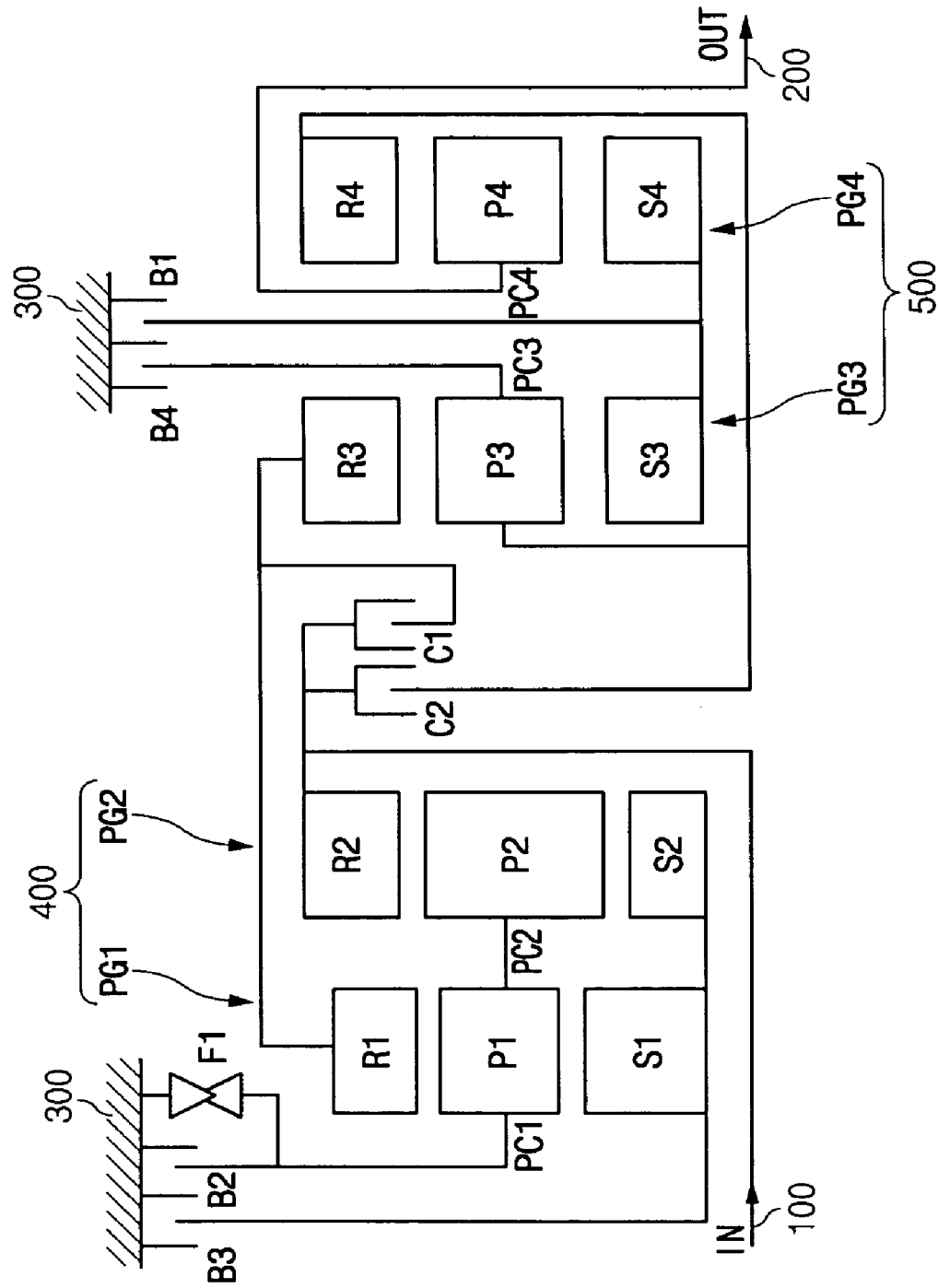
FIG. 7 is a schematic diagram of a power train of an automatic transmission according to a seventh exemplary embodiment of the present invention.

As shown in FIG. 7, according to the seventh exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof., The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the seventh exemplary embodiment of the present invention, the second ring gear R2 is operated as the fixed input member, the first planet carrier PC1 is operated as the first variably stopped member, the first sun gear S1 is operated as the second variably stopped member, and the first ring gear R1 is operated as the reduced speed output member.

The first sun gear S1 is fixedly connected to the second sun gear S2, and the first planet carrier PC1 is fixedly connected to the second planet carrier PC2.

In addition, the third ring gear R3 is operated as the first variable input member, at least one of the fixedly connected third planet carrier PC3 and fourth ring gear R4 is operated as the second variable input member, at least one of the fixedly connected third sun gear S3 and fourth sun gear S4 is operated as the third variably stopped member, the third planet carrier PC3 is operated as the fourth variably stopped member, and the fourth planet carrier PC4 is operated as the shift speed output member.

The first and second clutches C1 and C2 are disposed between the speed reduction unit 400 and the output unit 500.

The second and third brakes B2 and B3 are disposed on an opposite side to the output unit 500 with reference to the speed reduction unit 400.

The first and fourth brakes B1 and B4 are disposed between the third planetary gear set PG3 and the fourth planetary gear set PG4.

Hereinafter, referring to FIG. 8, the exemplary power train of an automatic transmission according to an eighth embodiment of the present invention will be described in detail.

Figure 8:
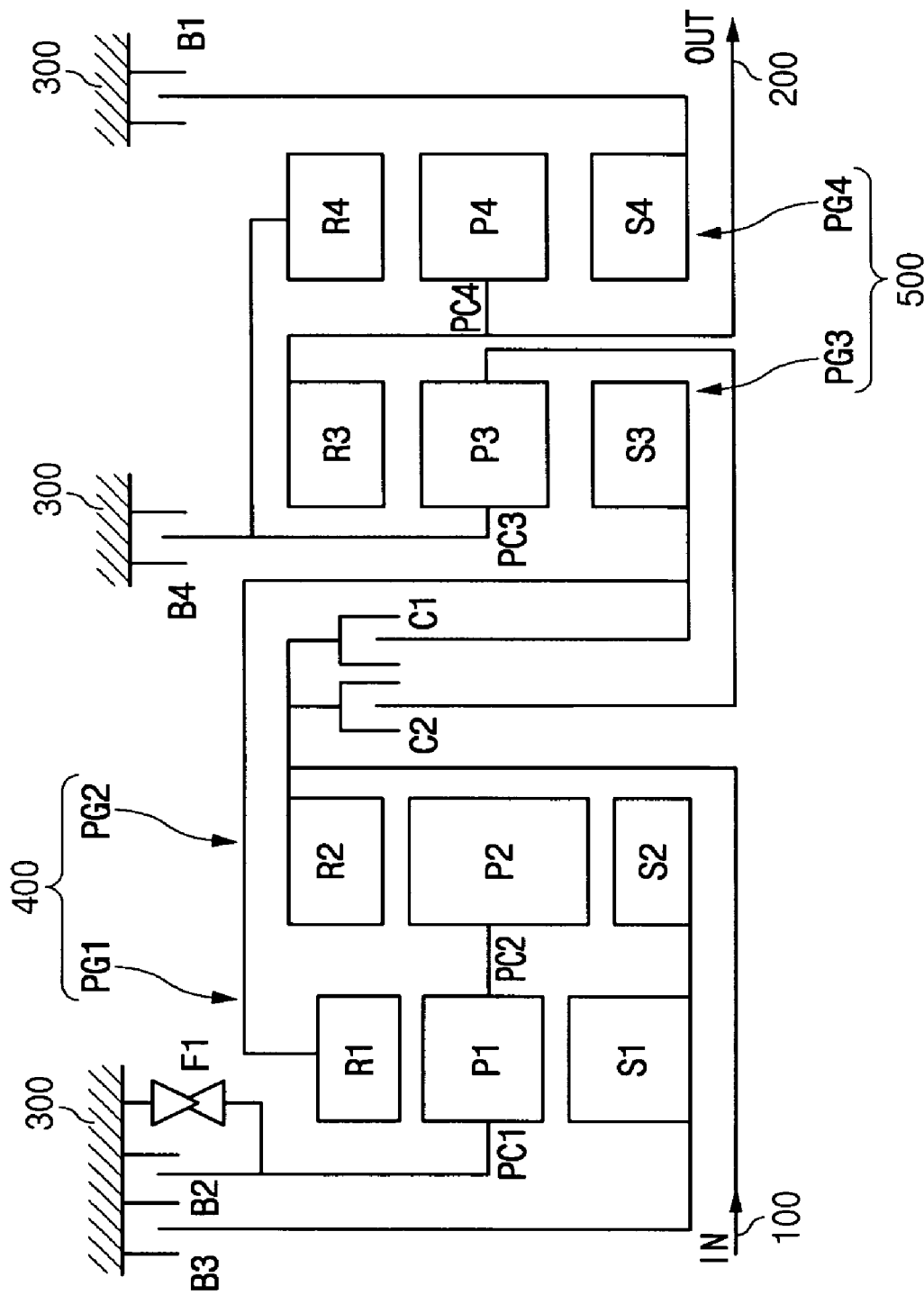
FIG. 8 is a schematic diagram of a power train of an automatic transmission according to a eighth exemplary embodiment of the present invention.

As shown in FIG. 8, according to the eighth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

The third planetary gear set PG3 is a single pinion planetary gear set, and includes a third sun gear S3, a third planet carrier PC3, and a third ring gear R3 as operational members thereof.

The fourth planetary gear set PG4 is a single pinion planetary gear set, and includes a fourth sun gear S4, a fourth planet carrier PC4, and a fourth ring gear R4 as operational members thereof.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the eighth exemplary embodiment of the present invention, the second ring gear R2 is operated as the fixed input member, the first planet carrier PC1 is operated as the first variably stopped member, the first sun gear S1 is operated as the second variably stopped member, and the first ring gear R1 is operated as the reduced speed output member.

The first sun gear S1 is fixedly connected to the second sun gear S2, and the first planet carrier PC1 is fixedly connected to the second planet carrier PC2.

In addition, the third sun gear S3 is operated as the first variable input member, the third planet carrier PC3 is operated as the second variable input member, the fourth sun gear S4 is operated as the third variably stopped member, at least one of the fixedly connected third planet carrier PC3 and fourth ring gear R4 is operated as the fourth variably stopped member, and at least one of the fixedly connected third ring gear R3 and fourth planet carrier PC4 is operated as the shift speed output member.

The first and second clutches C1 and C2 and the fourth brake B4 are disposed between the speed reduction unit 400 and the output unit 500.

The first brake B1 is disposed on an opposite side to the speed reduction unit 400 with reference to the output unit 500.

The second and third brakes B2 and B3 are disposed on an opposite side to the output unit 500 with reference to the speed reduction unit 400.

Hereinafter, referring to FIG. 9, the exemplary power train of an automatic transmission according to a ninth embodiment of the present invention will be described in detail.

Figure 9:
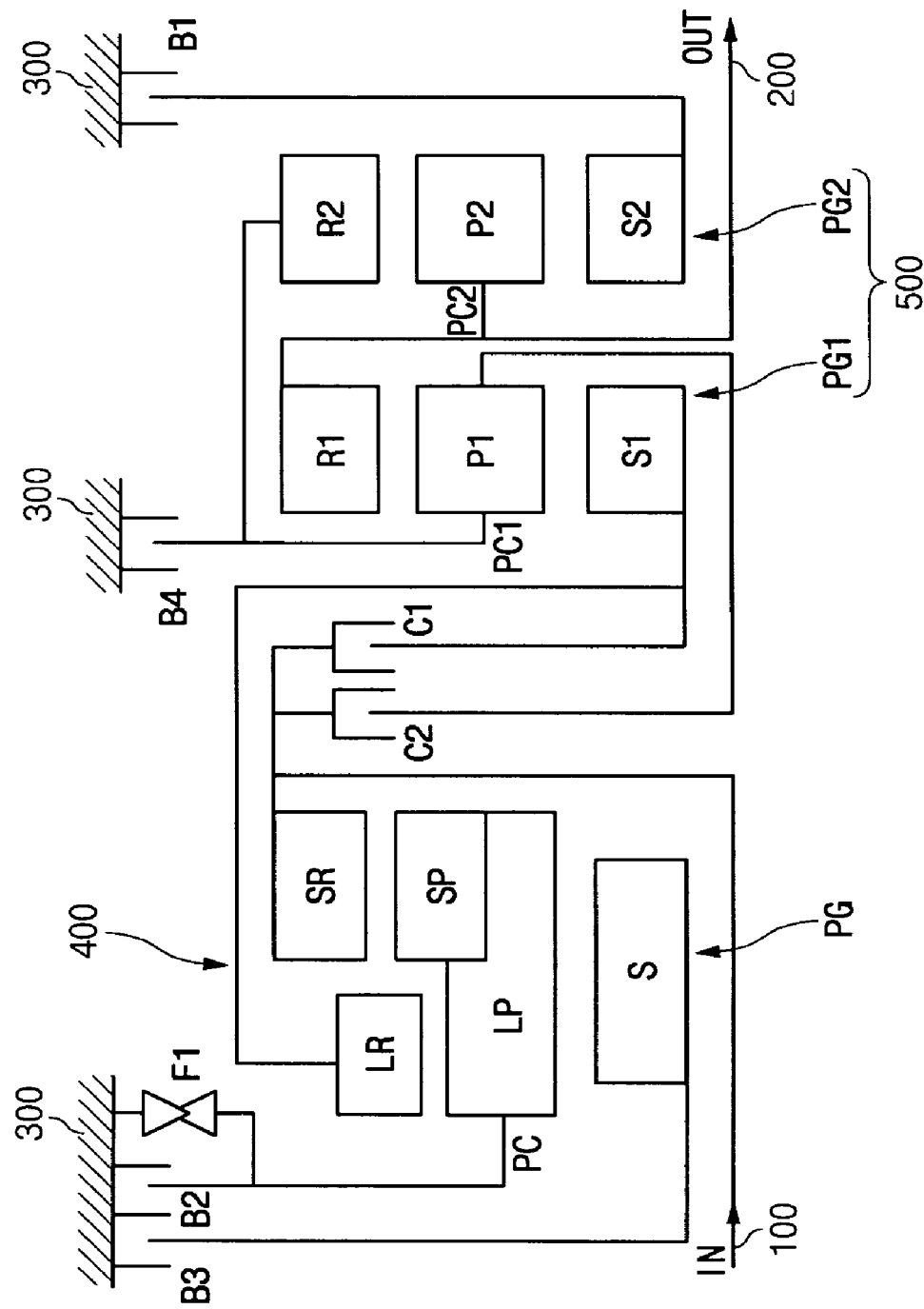
FIG. 9 is a schematic diagram of a power train of an automatic transmission according to a ninth exemplary embodiment of the present invention.

As shown in FIG. 9, according to the ninth exemplary embodiment of the present invention, the speed reduction unit 400 includes a compound planetary gear set PG, and the output unit 500 includes first and second planetary gear sets PG1 and PG2.

The compound planetary gear set PG includes a compound sun gear S, a compound planet carrier PC, a long-pinion-side ring gear LR, and a short-pinion-side ring gear SR as operational members thereof. In addition, a long pinion LP, being engaged with both the long-pinion-side ring gear LR and the compound sun gear S, and a short pinion SP, being engaged with both the short-pinion-side ring gear SR and the compound sun gear S, are connected to, and are carried by, the compound planet carrier PC.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

In addition, the compound planetary gear set PG and the first and second planetary gear sets PG1 and PG2 are disposed in a sequence of the compound planetary gear set PG, the first planetary gear set PG1, and the second planetary gear set PG2.

According to the ninth exemplary embodiment of the present invention, the short-pinion-side ring gear SR is operated as the fixed input member, the compound planet carrier PC is operated as the first variably stopped member, the compound sun gear S is operated as the second variably stopped member, and the long-pinion-side ring gear LR is operated as the reduced speed output member.

In addition, the first sun gear S1 is operated as the first variable input member, the first planet carrier PC1 is operated as the second variable input member, the second sun gear S2 is operated as the third variably stopped member, at least one of the fixedly connected first planet carrier PC1 and second ring gear R2 is operated as the fourth variably stopped member, and at least one of the fixedly connected first ring gear R1 and second planet carrier PC2 is operated as the shift speed output member.

According to the ninth exemplary embodiment of the present invention, the first and second clutches C1 and C2 and the fourth brake B4 are disposed between the speed reduction unit 400 and the output unit 500.

The second and third brakes B2 and B3 are disposed on an opposite side to the output unit 500 with reference to the speed reduction unit 400.

The first brake B1 is disposed on an opposite side to the speed reduction unit 400 with reference to the output unit 500.

Hereinafter, referring to FIG. 10, the exemplary power train of an automatic transmission according to a tenth embodiment of the present invention will be described in detail.

Figure 10:
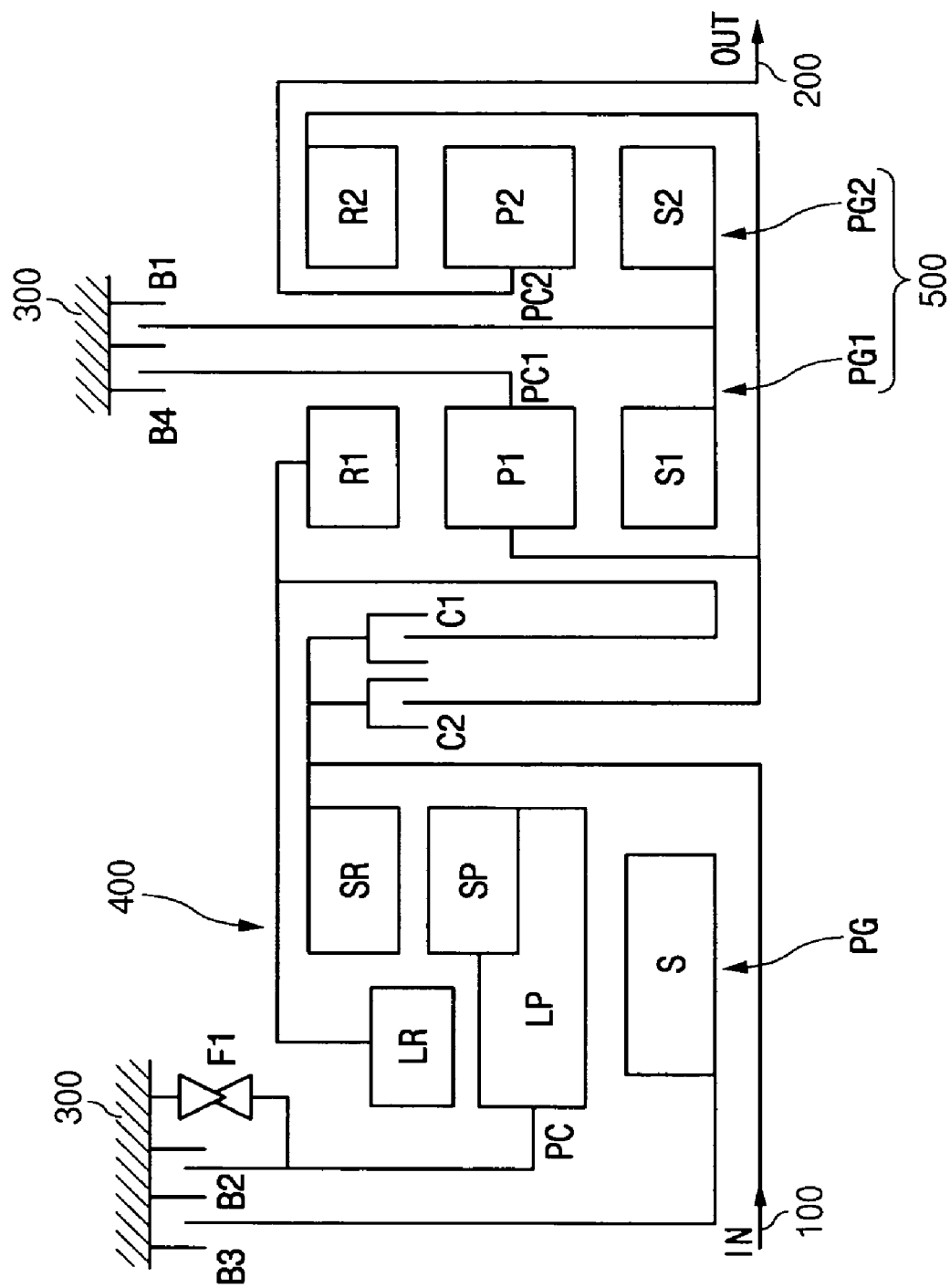
FIG. 10 is a schematic diagram of a power train of an automatic transmission according to a tenth exemplary embodiment of the present invention.

As shown in FIG. 10, according to the tenth exemplary embodiment of the present invention, the speed reduction unit 400 includes a compound planetary gear set PG, and the output unit 500 includes first and second planetary gear sets PG1 and PG2.

The compound planetary gear set PG includes a compound sun gear S, a compound planet carrier PC, a long-pinion-side ring gear LR, and a short-pinion-side ring gear SR as operational members thereof.

The first planetary gear set PG1 is a single pinion planetary gear set, and includes a first sun gear S1, a first planet carrier PC1, and a first ring gear R1 as operational members thereof.

The second planetary gear set PG2 is a single pinion planetary gear set, and includes a second sun gear S2, a second planet carrier PC2, and a second ring gear R2 as operational members thereof.

In addition, the compound planetary gear set PG and the first and second planetary gear sets PG1 and PG2 are disposed in a sequence of the compound planetary gear set PG, the first planetary gear set PG1, and the second planetary gear set PG2.

According to the tenth exemplary embodiment of the present invention, the short-pinion-side ring gear SR is operated as the fixed input member, the compound planet carrier PC is operated as the first variably stopped member, the compound sun gear S is operated as the second variably stopped member, and the long-pinion-side ring gear LR is operated as the reduced speed output member.

In addition, the first ring gear R1 is operated as the first variable input member, at least one of the fixedly connected first planet carrier PC1 and second ring gear R2 is operated as the second variable input member, at least one of the fixedly connected first sun gear S1 and second sun gear S2 is operated as the third variably stopped member, the first planet carrier PC1 is operated as the fourth variably stopped member, and the second planet carrier PC2 is operated as the shift speed output member.

The first and second clutches C1 and C2 are disposed between the speed reduction unit 400 and the output unit 500.

The second and third brakes B2 and B3 are disposed on an opposite side to the output unit 500 with reference to the speed reduction unit 400.

The first and fourth brakes B1 and B4 are disposed between the first planetary gear set PG1 and the second planetary gear set PG2.

Operations, shifting processes, and formations of each speed of the power trains according to the second through tenth embodiments of the present invention are similar to those of the power train according to the first embodiment of the present invention, and may be easily obtained by a person of an ordinary skill in the art based on the teachings herein. Thus, a detailed explanation thereof will be omitted.

According to the exemplary embodiments of the present invention, seven forward speeds and three reverse speeds may be realized.

In addition, according to the exemplary embodiments of the present invention, skip up-shifting and skip down-shifting may be facilitated by reducing frictional members engaged or released in a skip shifting process.

In addition, according to the exemplary embodiments of the present invention, the length of an automatic transmission may be reduced by effectively arranging clutches and brakes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
an input shaft;
an output gear;
a transmission case;
a speed reduction unit comprising a fixed input member that is fixedly connected to the input shaft, first and second variably stopped members that are variably connected to the transmission case, and a reduced speed output member that outputs first and second reduced rotational speeds;
an output unit comprising a first variable input member that is fixedly connected to the reduced speed output member and is variably connected to the input shaft, a second variable input member that is variably connected to the input shaft, third and fourth variably stopped members that are variably connected to the transmission case, a shift speed output member that always acts as an output member by being fixedly connected to the output gear, wherein the output unit generates seven forward speeds and three reverse speeds at the shift speed output member by operations of the first and second variable input members and the third and fourth variably stopped members;
a first clutch for variably connecting the first variable input member to the input shaft;
a second clutch for variably connecting the second variable input member to the input shaft;
a first brake for variably stopping the third variably stopped member;
a second brake for variably stopping the first variably stopped member;
a third brake for variably stopping the second variably stopped member; and
a fourth brake for variably stopping the fourth variably stopped member.

2. The power train of claim 1, wherein the speed reduction unit comprises a Ravigneaux planetary gear set having a long-pinion-side sun gear, a short-pinion-side sun gear, a Ravigneaux planet carrier, and a Ravigneaux ring gear as operational members thereof,
wherein the short-pinion-side sun gear is operated as the fixed input member,
the Ravigneaux planet carrier is operated as the first variably stopped member,
the long-pinion-side sun gear is operated as the second variably stopped member, and
the Ravigneaux ring gear is operated as the reduced speed output member.

3. The power train of claim 2, wherein the output unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first ring gear is operated as the first variable input member,
at least one of the fixedly connected first planet carrier and second ring gear is operated as the second variable input member, at least one of the fixedly connected first sun gear and second sun gear is operated as the third variably stopped member, the first planet carrier is operated as the fourth variably stopped member, and the second planet carrier is operated as the shift speed output member.

4. The power train of claim 3, wherein the Ravigneaux planetary gear set and the first and second planetary gear sets are disposed in a sequence of the Ravigneaux planetary gear set, the first planetary gear set, and the second planetary gear set.

5. The power train of claim 3, wherein the first and second clutches are disposed between the speed reduction unit and the output unit.

6. The power train of claim 3, wherein the second and third brakes are disposed on an opposite side to the output unit with reference to the speed reduction unit.

7. The power train of claim 3, wherein the first and fourth brakes are disposed between the first planetary gear set and the second planetary gear set.

8. The power train of claim 3, further comprising a one-way clutch that is disposed in parallel with the second brake and is disposed between the first variably stopped member and the transmission case.

9. The power train of claim 3, wherein the input shaft and the output gear are disposed on the same side.

10. The power train of claim 3, wherein:

the first and second brakes and a one-way clutch are operated in a first forward speed, the first and third brakes are operated in a second forward speed, the first clutch and the first brake are operated in a third forward speed, the second clutch and the first brake are operated in a fourth forward speed, the first and second clutches are operated in a fifth forward speed, the second clutch and the third brake are operated in a sixth forward speed, the second clutch and the second brake are operated in a seventh forward speed, the second and fourth brakes are operated in a first reverse speed, the third and fourth brakes are operated in a second reverse speed, and the first clutch and the fourth brake are operated in a third reverse speed.

11. The power train of claim 2, wherein the output unit comprises:

a first planetary gear set having a first sun gear, a first planet carrier, and a first ring gear as operational members thereof; and a second planetary gear set having a second sun gear, a second planet carrier, and a second ring gear as operational members thereof, wherein the first sun gear is operated as the first variable input member, the first planet carrier is operated as the second variable input member, the second sun gear is operated as the third variably stopped member, at least one of the fixedly connected first planet carrier and second ring gear is operated as the fourth variably stopped member, and at least one of the fixedly connected first ring gear and second planet carrier is operated as the shift speed output member.

12. The power train of claim 11, wherein the Ravigneaux planetary gear set and the first and second planetary gear sets are disposed in a sequence of the Ravigneaux planetary gear set, the first planetary gear set, and the second planetary gear set.

13. The power train of claim 11, wherein the first and second clutches and the fourth brake are disposed between the speed reduction unit and the output unit.

14. The power train of claim 11, wherein the second and third brakes are disposed on an opposite side to the output unit with reference to the speed reduction unit.

15. The power train of claim 11, wherein the first brake is disposed on an opposite side to the speed reduction unit with reference to the output unit.

16. The power train of claim 11, further comprising a one-way clutch that is disposed in parallel with the second brake and is disposed between the first variably stopped member and the transmission case.

17. The power train of claim 11, wherein the input shaft and the output gear are disposed on the same side.

18. The power train of claim 11, wherein:

the first and second brakes and a one-way clutch are operated in a first forward speed, the first and third brakes are operated in a second forward speed, the first clutch and the first brake are operated in a third forward speed, the second clutch and the first brake are operated in a fourth forward speed, the first and second clutches are operated in a fifth forward speed, the second clutch and the third brake are operated in a sixth forward speed, the second clutch and the second brake are operated in a seventh forward speed, the second and fourth brakes are operated in a first reverse speed, the third and fourth brakes are operated in a second reverse speed, and the first clutch and the fourth brake are operated in a third reverse speed.

19. The power train of claim 1, wherein the speed reduction unit comprises:

a first planetary gear set having a first sun gear, a first planet carrier, and a first ring gear as operational members thereof; and a second planetary gear set having a second sun gear, a second planet carrier, and a second ring gear as operational members thereof, wherein the second ring gear is operated as the fixed input member, the first planet carrier is operated as the first variably stopped member, the first sun gear is operated as the second variably stopped member, the first ring gear is operated as the reduced speed output member, the second sun gear is fixedly connected to the first sun gear, and the second planet carrier is fixedly connected to the first ring gear.

20. The power train of claim 19, wherein the output unit comprises:
- a third planetary gear set having a third sun gear, a third planet carrier, and a third ring gear as operational members thereof; and
- a fourth planetary gear set having a fourth sun gear, a fourth planet carrier, and a fourth ring gear as operational members thereof,
- wherein the third sun gear is operated as the first variable input member,
- the third planet carrier is operated as the second variable input member,
- the fourth sun gear is operated as the third variably stopped member,
- at least one of the fixedly connected third planet carrier and fourth ring gear is operated as the fourth variably stopped member, and
- at least one of the fixedly connected third ring gear and fourth planet carrier is operated as the shift speed output member.

21. The power train of claim 20, wherein the first, second, third, and fourth planetary gear sets are disposed in a sequence of the first planetary gear set, the second planetary gear set, the third planetary gear set, and the fourth planetary gear set.

22. The power train of claim 20, wherein the first and second clutches and the fourth brake are disposed between the speed reduction unit and the output unit.

23. The power train of claim 20, wherein the second and third brakes are disposed on an opposite side to the output unit with reference to the speed reduction unit.

24. The power train of claim 20, wherein the first brake is disposed on an opposite side to the speed reduction unit with reference to the output unit.

25. The power train of claim 20, further comprising a one-way clutch that is disposed in parallel with the second brake and is disposed between the first variably stopped member and the transmission case.

26. The power train of claim 20, wherein the input shaft and the output gear are disposed on the same side.

27. The power train of claim 20, wherein:
- the first and second brakes and a one-way clutch are operated in a first forward speed,
- the first and third brakes are operated in a second forward speed,
- the first clutch and the first brake are operated in a third forward speed,
- the second clutch and the first brake are operated in a fourth forward speed,
- the first and second clutches are operated in a fifth forward speed,
- the second clutch and the third brake are operated in a sixth forward speed,
- the second clutch and the second brake are operated in a seventh forward speed,
- the second and fourth brakes are operated in a first reverse speed,
- the third and fourth brakes are operated in a second reverse speed, and
- the first clutch and the fourth brake are operated in a third reverse speed.

28. The power train of claim 19, wherein the output unit comprises:
- a third planetary gear set having a third sun gear, a third planet carrier, and a third ring gear as operational members thereof; and
- a fourth planetary gear set having a fourth sun gear, a fourth planet carrier, and a fourth ring gear as operational members thereof,
- wherein the third ring gear is operated as the first variable input member,
- at least one of the fixedly connected third planet carrier and fourth ring gear is operated as the second variable input member,
- at least one of the fixedly connected third sun gear and fourth sun gear is operated as the third-variably stopped member,
- the third planet carrier is operated as the fourth variably stopped member, and
- the fourth planet carrier is operated as the shift speed output member.

29. The power train of claim 28, wherein the first, second, third, and fourth planetary gear sets are disposed in a sequence of the first planetary gear set, the second planetary gear set, the third planetary gear set, and the fourth planetary gear set.

30. The power train of claim 28, wherein the first and second clutches are disposed between the speed reduction unit and the output unit.

31. The power train of claim 28, wherein the second and third brakes are disposed on an opposite side to the output unit with reference to the speed reduction unit.

32. The power train of claim 28, wherein the first and fourth brakes are disposed between the third planetary gear set and the fourth planetary gear set.

33. The power train of claim 28, further comprising a one-way clutch that is disposed in parallel with the second brake and is disposed between the first variably stopped member and the transmission case.

34. The power train of claim 28, wherein the input shaft and the output gear are disposed on the same side.

35. The power train of claim 28, wherein:
- the first and second brakes and a one-way clutch are operated in a first forward speed,
- the first and third brakes are operated in a second forward speed,
- the first clutch and the first brake are operated in a third forward speed,
- the second clutch and the first brake are operated in a fourth forward speed,
- the first and second clutches are operated in a fifth forward speed,
- the second clutch and the third brake are operated in a sixth forward speed,
- the second clutch and the second brake are operated in a seventh forward speed,
- the second and fourth brakes are operated in a first reverse speed,
- the third and fourth brakes are operated in a second reverse speed, and
- the first clutch and the fourth brake are operated in a third reverse speed.

36. The power train of claim 1, wherein the speed reduction unit comprises:
- a first planetary gear set having a first sun gear, a first planet carrier, and a first ring gear as operational members thereof; and
- a second planetary gear set having a second sun gear, a second planet carrier, and a second ring gear as operational members thereof,
- wherein the second sun gear is operated as the fixed input member,
- the first planet carrier is operated as the first variably stopped member,
- the first sun gear is operated as the second variably stopped member, at least one of the fixedly connected first ring gear and second planet carrier is operated as the reduced speed output member, and the second ring gear is fixedly connected to the first planet carrier.

37. The power train of claim 36, wherein the output unit comprises:

a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the third planet carrier is operated as the second variable input member, the fourth sun gear is operated as the third variably stopped member, at least one of the fixedly connected third planet carrier and fourth ring gear is operated as the fourth variably stopped member, and at least one of the fixedly connected third ring gear and fourth planet carrier is operated as the shift speed output member.

38. The power train of claim 37, wherein the first, second, third, and fourth planetary gear sets are disposed in a sequence of the first planetary gear set, the second planetary gear set, the third planetary gear set, and the fourth planetary gear set.

39. The power train of claim 37, wherein the first and second clutches and the fourth brake are disposed between the speed reduction unit and the output unit.

40. The power train of claim 37, wherein the second and third brakes are disposed on an opposite side to the output unit with reference to the speed reduction unit.

41. The power train of claim 37, wherein the first brake is disposed on an opposite side to the speed reduction unit with reference to the output unit.

42. The power train of claim 37, further comprising a one-way clutch that is disposed in parallel with the second brake and is disposed between the first variably stopped member and the transmission case.

43. The power train of claim 37, wherein the input shaft and the output gear are disposed on the same side.

44. The power train of claim 37, wherein:

the first and second brakes and a one-way clutch are operated in a first forward speed, the first and third brakes are operated in a second forward speed, the first clutch and the first brake are operated in a third forward speed, the second clutch and the first brake are operated in a fourth forward speed, the first and second clutches are operated in a fifth forward speed, the second clutch and the third brake are operated in a sixth forward speed, the second clutch and the second brake are operated in a seventh forward speed, the second and fourth brakes are operated in a first reverse speed, the third and fourth brakes are operated in a second reverse speed, and the first clutch and the fourth brake are operated in a third reverse speed.

45. The power train of claim 36, wherein the output unit comprises:

a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is operated as the first variable input member, at least one of the fixedly connected third planet carrier and fourth ring gear is operated as the second variable input member, at least one of the fixedly connected third sun gear and fourth sun gear is operated as the third variably stopped member, and the third planet carrier is operated as the fourth variably stopped member.

46. The power train of claim 45, wherein the first, second, third, and fourth planetary gear sets are disposed in a sequence of the first planetary gear set, the second planetary gear set, the third planetary gear set, and the fourth planetary gear set.

47. The power train of claim 45, wherein the first and second clutches are disposed between the speed reduction unit and the output unit.

48. The power train of claim 45, wherein the second and third brakes are disposed on an opposite side to the output unit with reference to the speed reduction unit.

49. The power train of claim 45, wherein the first and fourth brakes are disposed between the third planetary gear set and the fourth planetary gear set.

50. The power train of claim 45, further comprising a one-way clutch that is disposed in parallel with the second brake and is disposed between the first variably stopped member and the transmission case.

51. The power train of claim 45, wherein the input shaft and the output gear are disposed on the same side.

52. The power train of claim 45, wherein:

the first and second brakes and a one-way clutch are operated in a first forward speed, the first and third brakes are operated in a second forward speed, the first clutch and the first brake are operated in a third forward speed, the second clutch and the first brake are operated in a fourth forward speed, the first and second clutches are operated in a fifth forward speed, the second clutch and the third brake are operated in a sixth forward speed, the second clutch and the second brake are operated in a seventh forward speed, the second and fourth brakes are operated in a first reverse speed, the third and fourth brakes are operated in a second reverse speed, and the first clutch and the fourth brake are operated in a third reverse speed.

53. The power train of claim 1, wherein the speed reduction unit comprises:

a first planetary gear set having a first sun gear, a first planet carrier, and a first ring gear as operational members thereof; and a second planetary gear set having a second sun gear, a second planet carrier, and a second ring gear as operational members thereof, wherein the second ring gear is operated as the fixed input member, the first planet carrier is operated as the first variably stopped member, the first sun gear is operated as the second variably stopped member, the first ring gear is operated as the reduced speed output member, the first sun gear is fixedly connected to the second sun gear, and the first planet carrier is fixedly connected to the second planet carrier.

54. The power train of claim 53, wherein the output unit comprises:

a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is operated as the first variable input member, at least one of the fixedly connected third planet carrier and fourth ring gear is operated as the second variable input member, at least one of the fixedly connected third sun gear and fourth sun gear is operated as the third variably stopped member, the third planet carrier is operated as the fourth variably stopped member, and the fourth planet carrier is operated as the shift speed output member.

55. The power train of claim 54, wherein the first, second, third, and fourth planetary gear sets are disposed in a sequence of the first planetary gear set, the second planetary gear set, the third planetary gear set, and the fourth planetary gear set.

56. The power train of claim 54, wherein the first and second clutches are disposed between the speed reduction unit and the output unit.

57. The power train of claim 54, wherein the second and third brakes are disposed on an opposite side to the output unit with reference to the speed reduction unit.

58. The power train of claim 54, wherein the first and fourth brakes are disposed between the third planetary gear set and the fourth planetary gear set.

59. The power train of claim 54, further comprising a one-way clutch that is disposed in parallel with the second brake and is disposed between the first variably stopped member and the transmission case.

60. The power train of claim 54, wherein the input shaft and the output gear are disposed on the same side.

61. The power train of claim 54, wherein:

the first and second brakes and a one-way clutch are operated in a first forward speed, the first and third brakes are operated in a second forward speed, the first clutch and the first brake are operated in a third forward speed, the second clutch and the first brake are operated in a fourth forward speed, the first and second clutches are operated in a fifth forward speed, the second clutch and the third brake are operated in a sixth forward speed, the second clutch and the second brake are operated in a seventh forward speed, the second and fourth brakes are operated in a first reverse speed, the third and fourth brakes are operated in a second reverse speed, and the first clutch and the fourth brake are operated in a third reverse speed.

62. The power train of claim 53, wherein the output unit comprises:

a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is operated as the first variable input member, the third planet carrier is operated as the second variable input member, the fourth sun gear is operated as the third variably stopped member, at least one of the fixedly connected third planet carrier and fourth ring gear is operated as the fourth variably stopped member, and at least one of the fixedly connected third ring gear and fourth planet carrier is operated as the shift speed output member.

63. The power train of claim 62, wherein the first, second, third, and fourth planetary gear sets are disposed in a sequence of the first planetary gear set, the second planetary gear set, the third planetary gear set, and the fourth planetary gear set.

64. The power train of claim 62, wherein the first and second clutches and the fourth brake are disposed between the speed reduction unit and the output unit.

65. The power train of claim 62, wherein the second and third brakes are disposed on an opposite side to the output unit with reference to the speed reduction unit.

66. The power train of claim 62, wherein the first brake is disposed on an opposite side to the speed reduction unit with reference to the output unit.

67. The power train of claim 62, further comprising a one-way clutch that is disposed in parallel with the second brake and is disposed between the first variably stopped member and the transmission case.

68. The power train of claim 62, wherein the input shaft and the output gear are disposed on the same side.

69. The power train of claim 62, wherein:

the first and second brakes and a one-way clutch are operated in a first forward speed, the first and third brakes are operated in a second forward speed, the first clutch and the first brake are operated in a third forward speed, the second clutch and the first brake are operated in a fourth forward speed, the first and second clutches are operated in a fifth forward speed, the second clutch and the third brake are operated in a sixth forward speed, the second clutch and the second brake are operated in a seventh forward speed, the second and fourth brakes are operated in a first reverse speed, the third and fourth brakes are operated in a second reverse speed, and the first clutch and the fourth brake are operated in a third reverse speed.

70. The power train of claim 1, wherein the speed reduction unit comprises a compound planetary gear set having a compound sun gear, a compound planet carrier, a long-pinion-side ring gear, and a short-pinion-side ring gear as operational members thereof,
wherein the short-pinion-side ring gear is operated as the fixed input member,
the compound planet carrier is operated as the first variably stopped member,
the compound sun gear is operated as the second variably stopped member, and
the long-pinion-side ring gear is operated as the reduced speed output member.

71. The power train of claim 70, wherein the output unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first sun gear is operated as the first variable input member,
the first planet carrier is operated as the second variable input member,
the second sun gear is operated as the third variably stopped member,
at least one of the fixedly connected first planet carrier and second ring gear is operated as the fourth variably stopped member, and
at least one of the fixedly connected first ring gear and second planet carrier is operated as the shift speed output member.

72. The power train of claim 71, wherein the compound planetary gear set and the first and second planetary gear sets are disposed in a sequence of the compound planetary gear set, the first planetary gear set, and the second planetary gear set.

73. The power train of claim 71, wherein the first and second clutches and the fourth brake are disposed between the speed reduction unit and the output unit.

74. The power train of claim 71, wherein the second and third brakes are disposed on an opposite side to the output unit with reference to the speed reduction unit.

75. The power train of claim 71, wherein the first brake is disposed on an opposite side to the speed reduction unit with reference to the output unit.

76. The power train of claim 71, further comprising a one-way clutch that is disposed in parallel with the second brake and is disposed between the first variably stopped member and the transmission case.

77. The power train of claim 71, wherein the input shaft and the output gear are disposed on the same side.

78. The power train of claim 71, wherein:
the first and second brakes and a one-way clutch are operated in a first forward speed,
the first and third brakes are operated in a second forward speed,
the first clutch and the first brake are operated in a third forward speed,
the second clutch and the first brake are operated in a fourth forward speed,
the first and second clutches are operated in a fifth forward speed,
the second clutch and the third brake are operated in a sixth forward speed,
the second clutch and the second brake are operated in a seventh forward speed,
the second and fourth brakes are operated in a first reverse speed,
the third and fourth brakes are operated in a second reverse speed, and
the first clutch and the fourth brake are operated in a third reverse speed.

79. The power train of claim 70, wherein the output unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first ring gear is operated as the first variable input member,
at least one of the fixedly connected first planet carrier and second ring gear is operated as the second variable input member,
at least one of the fixedly connected first sun gear and second sun gear is operated as the third variably stopped member,
the first planet carrier is operated as the fourth variably stopped member, and
the second planet carrier is operated as the shift speed output member.

80. The power train of claim 79, wherein the compound planetary gear set and the first and second planetary gear sets are disposed in a sequence of the compound planetary gear set, the first planetary gear set, and the second planetary gear set.

81. The power train of claim 79, wherein the first and second clutches are disposed between the speed reduction unit and the output unit.

82. The power train of claim 79, wherein the second and third brakes are disposed on an opposite side to the output unit with reference to the speed reduction unit.

83. The power train of claim 79, wherein the first and fourth brakes are disposed between the first planetary gear set and the second planetary gear set.

84. The power train of claim 79, wherein a one-way clutch that is disposed in parallel with the second brake and is disposed between the first variably stopped member and the transmission case.

85. The power train of claim 79, wherein the input shaft and the output gear are disposed on the same side.

86. The power train of claim 79, wherein:
the first and second brakes and a one-way clutch are operated in a first forward speed,
the first and third brakes are operated in a second forward speed,
the first clutch and the first brake are operated in a third forward speed,
the second clutch and the first brake are operated in a fourth forward speed,
the first and second clutches are operated in a fifth forward speed,
the second clutch and the third brake are operated in a sixth forward speed,
the second clutch and the second brake are operated in a seventh forward speed,
the second and fourth brakes are operated in a first reverse speed,
the third and fourth brakes are operated in a second reverse speed, and
the first clutch and the fourth brake are operated in a third reverse speed.

* * * * *